US012248945B2

(12) United States Patent
Fulper et al.

(10) Patent No.: US 12,248,945 B2
(45) Date of Patent: Mar. 11, 2025

(54) SYSTEM AND METHOD FOR QUANTIFYING SOURCE AND COMPONENT EMISSION RATES FROM A BODY IN A FLOW FIELD

(71) Applicant: U.S. GOVERNMENT, as represented by the Administrator of the U.S. ENVIRONMENTAL PROTECTION, Washington, DC (US)

(72) Inventors: Carl R. Fulper, Ann Arbor, MI (US); Timothy Hamacher Defries, Austin, TX (US); Scott Clinton Douglas, Dallas, TX (US)

(73) Assignee: U.S. GOVERNMENT, as represented by the Administrator of the U.S. ENVIRONMENTAL PROTECTION AGENCY, Washington, DC (US)

( * ) Notice: Subject to any disclaimer, the term of this patent is extended or adjusted under 35 U.S.C. 154(b) by 321 days.

(21) Appl. No.: 17/945,721

(22) Filed: Sep. 15, 2022

(65) Prior Publication Data

US 2023/0101265 A1 Mar. 30, 2023

Related U.S. Application Data

(60) Provisional application No. 63/360,229, filed on Sep. 15, 2021.

(51) Int. Cl.
*G01M 15/10* (2006.01)
*G01N 1/22* (2006.01)
(Continued)

(52) U.S. Cl.
CPC ......... *G06Q 30/018* (2013.01); *G01N 1/2252* (2013.01); *G01N 21/3504* (2013.01); *G06Q 50/26* (2013.01); *G01M 15/102* (2013.01)

(58) Field of Classification Search
CPC .... G06Q 30/018; G06Q 50/26; G01N 1/2252; G01N 21/3504; G01N 2021/396; G01M 15/102; G01M 15/108
(Continued)

(56) References Cited

U.S. PATENT DOCUMENTS 5,210,702 A   5/1993  Bishop et al.
5,319,199 A   6/1994  Stedman et al.
(Continued)

FOREIGN PATENT DOCUMENTS

CN   112113911 A  * 12/2020  ............. G01D 21/02
CN   112113912 A  * 12/2020  ............. G01D 21/02

OTHER PUBLICATIONS

Kemper et al., "Investigation of the Ability of RSD to Detect Evaporative Emissions", 19th CRC On-Road Vehicle Emissions Workshop, Mar. 23, 2009.
(Continued)

*Primary Examiner* — Robert R Raevis
(74) *Attorney, Agent, or Firm* — Caesar Rivise, PC

(57) ABSTRACT

A system and method that remotely quantifies mass emission rates of emission material emitted from moving vehicles as they operate in real-time. Release locations of these emission materials may or may not coincide, and plumes generated from the releases may be spatially overlapping or distinct. The method can quantify both distance-based mass emission rates (grams/mile) and time-based emission rates (gram/hour). Exemplary approaches can be used to measure vehicle emissions as they move whether the emissions are released from the tailpipe or elsewhere on the vehicle and without touching the vehicle. The approaches might also be used in other situations where material is emitted from a body in a flow field, such as an aircraft or marine vessel moving through air, a stationary source in a wind field, or
(Continued)

brake or tire wear particulate material of a heavy-duty truck driving on the road.

20 Claims, 21 Drawing Sheets

(51) Int. Cl.
  *G01N 21/3504* (2014.01)
  *G06Q 30/018* (2023.01)
  *G06Q 50/26* (2012.01)
(58) Field of Classification Search
  USPC ............. 73/23.31–23.33; 356/437, 438; 250/339.12, 339.13, 341.8
  See application file for complete search history.

(56) References Cited

U.S. PATENT DOCUMENTS

| | | | |
|---|---|---|---|
| 5,371,367 A | 12/1994 | DiDomenico et al. | |
| 5,401,967 A | 3/1995 | Stedman et al. | |
| 5,489,777 A | 2/1996 | Stedman et al. | |
| 5,498,872 A | 3/1996 | Stedman et al. | |
| 5,726,450 A | 3/1998 | Peterson et al. | |
| 5,831,267 A | 11/1998 | Jack et al. | |
| 5,946,095 A * | 8/1999 | Henningsen | G01N 21/359 356/519 |
| 6,230,087 B1 | 5/2001 | DiDomenico et al. | |
| 6,560,545 B2 | 5/2003 | Stedman et al. | |
| 6,671,630 B2 | 12/2003 | Stedman et al. | |
| 6,701,256 B2 | 3/2004 | Stedman et al. | |
| 6,723,989 B1 | 4/2004 | DiDomenico et al. | |
| 6,723,990 B2 | 4/2004 | DiDomenico et al. | |
| 6,744,059 B2 | 6/2004 | DiDomenico et al. | |
| 6,744,516 B2 | 6/2004 | DiDomenico et al. | |
| 6,757,607 B2 | 6/2004 | Rendahl et al. | |
| 6,833,922 B2 | 12/2004 | DiDomenico et al. | |
| 6,841,778 B1 | 1/2005 | Shifflett et al. | |
| 6,900,893 B2 | 5/2005 | Foley et al. | |
| 6,983,639 B1 | 1/2006 | DiDomenico et al. | |
| 7,016,789 B2 | 3/2006 | Stedman et al. | |
| 7,141,793 B2 | 11/2006 | Johnson et al. | |
| 7,164,132 B2 | 1/2007 | DiDomenico et al. | |
| 7,274,994 B2 | 9/2007 | Stedman et al. | |
| 7,359,804 B2 | 4/2008 | Williams et al. | |
| 7,400,398 B2 | 7/2008 | Stedman | |
| 7,485,861 B2 | 2/2009 | Full | |
| RE40,767 E | 6/2009 | Peterson et al. | |
| 7,930,931 B2 | 4/2011 | Stedman | |
| 8,134,711 B2 | 3/2012 | Hager | |
| 8,266,952 B2 | 9/2012 | Stedman | |
| 8,330,957 B2 | 12/2012 | Hager | |
| 8,347,701 B2 | 1/2013 | Stedman | |
| 8,429,957 B2 | 4/2013 | Stedman | |
| RE44,214 E | 5/2013 | Peterson et al. | |
| 8,447,528 B2 | 5/2013 | Gentala et al. | |
| 8,654,335 B2 | 2/2014 | Hager et al. | |
| 8,838,396 B2 | 9/2014 | Gentala et al. | |
| 9,057,664 B2 | 6/2015 | Stedman | |
| 9,228,938 B2 | 1/2016 | Hager et al. | |
| 9,562,849 B2 | 2/2017 | Kester et al. | |
| 9,599,508 B2 | 3/2017 | Kester et al. | |
| 9,625,318 B2 | 4/2017 | Kester et al. | |
| 9,756,263 B2 | 9/2017 | Kester et al. | |
| 10,055,906 B1 | 8/2018 | Fournier et al. | |
| 10,084,975 B2 | 9/2018 | Kester et al. | |
| 10,254,166 B2 | 4/2019 | Kester et al. | |
| 10,267,686 B2 | 4/2019 | Kester et al. | |
| 10,337,989 B2 | 7/2019 | McClintock et al. | |
| 10,375,327 B2 | 8/2019 | Kester | |
| 10,444,070 B2 | 10/2019 | Kester et al. | |
| 10,458,905 B2 | 10/2019 | Kester et al. | |
| 10,605,725 B2 | 3/2020 | Mallery et al. | |
| 10,648,960 B2 | 5/2020 | Kester et al. | |
| 10,834,338 B2 | 11/2020 | Kester et al. | |
| 10,845,302 B2 | 11/2020 | Mallery et al. | |
| 10,893,220 B2 | 1/2021 | Kester et al. | |
| 10,914,632 B2 | 2/2021 | Kester et al. | |
| 10,914,639 B2 | 2/2021 | Kester et al. | |
| 10,948,404 B2 | 3/2021 | Kester et al. | |
| 10,955,355 B2 | 3/2021 | Kester et al. | |
| 10,989,597 B2 | 4/2021 | Kester et al. | |
| 11,044,423 B2 | 6/2021 | Kester | |
| 11,287,409 B2 | 3/2022 | Kester et al. | |
| 11,290,662 B2 | 3/2022 | Kester et al. | |

OTHER PUBLICATIONS

Kemper et al., "Investigation of the Ability of RSD to Detect Fleet Vehicles that have Elevated Running Loss Emissions", 20th CRC On-Road Vehicle Emissions Workshop, Mar. 22, 2010.

Kemper et al., "Evaporative Emissions Detection Using Conventional RSD", 26th Annual Clean Air Conference, Sep. 29, 2010.

Defries et al., "Investigation of Techniques for High Evaporative Emissions Vehicle Detection: Denver Summer 2008 Pilot Study at Lipan Street Station", Report Version 5, prepared for United States Environmental Protection Agency by Eastern Research Group, Inc., Dec. 9, 2009.

Defries et al., "Estimated Summer Hot-Soak Distributions for Denver's Ken Caryl I/M Station Fleet" Final Report, Version 8, prepared for United States Environmental Protection Agency by Eastern Research Group, Inc., Feb. 8, 2012.

Defries et al., "Characterization of Real World Evaporative Emissions", 2016 TRB Summer Conference on Transportation Planning and Air Quality, Presentation, Aug. 4-5, 2016.

Defries et al., "High Evaporative Emission Investigation Field Study", Report Version 4, EPA-200226, prepared for United States Environmental Protection Agency by Eastern Research Group, Inc., Jan. 2022.

Bishop et al., "Vehicle Exhaust Remote Sensing Device Method to Screen Vehicles for Evaporative Running Loss Emissions", Environmental Science and Technology, vol. 54, Issue 22, pp. 14627-14634, Nov. 6, 2020.

Bishop et al., Supporting Information for Vehicle Exhaust Remote Sensing Device Method to Screen Vehicles for Evaporative Running Loss Emissions. Not dated.

Defries et al., "On-Road Measurement of Running Losses by Remote Sensing", 30th CRC Real-World Emissions Workshop, Mar. 8-11, 2021.

Haskew et al., "Vehicle Evaporative Emission Mechanisms: A Pilot Study", CRC Project E-77, prepared for Coordinating Research Council by Harold Haskew & Associates, Inc., Jun. 24, 2008.

Haskew et al., "Enhanced Evaporative Emission Vehicles", prepared for Coordinating Research Council by Harold Haskew & Associates, Inc., Mar. 2010.

Haskew et al., "Study to Determine Evaporative Emission Breakdown, including Permeation Effects and Diurnal Emissions using E20 Fuels on Aging Enhanced Evaporative Emissions Certified Vehicles", prepared for Coordinating Research Council by Harold Haskew & Associates, Inc., Dec. 2010.

Lindner et al., "Multi-Day Diurnal Testing", prepared by Eastern Research Group for United States Protection Agency, Mar. 22, 2012.

Weatherby et al., "Analysis of Evaporative On-Board Diagnostic (OBD) Readiness and DTCs using I/M Data", prepared by Eastern Research Group for United States Environmental Protection Agency, Feb. 19, 2014.

Sabisch et al., "Running Loss Testing with Implanted Leaks," prepared by SGS-ETC, Eastern Research Group, Inc. for United States Environmental Protection Agency, Feb. 18, 2014.

"Evaluation of the Effectiveness of On-Board Diagnostic (OBD) Systems in Identifying Fuel Vapor Losses from Light-Duty Vehicles," prepared by Eastern Research Group for United States Environmental Protection Agency, Apr. 5, 2013.

"Fuel Tank Temperature Profile Development for Highway Driving," prepared by Eastern Research Group and SGS-Environmental

(56) References Cited

OTHER PUBLICATIONS

Testing Corporation for United States Environmental Protection Agency, Oct. 2014.

\* cited by examiner

SYSTEM AND METHOD FOR QUANTIFYING SOURCE AND COMPONENT EMISSION RATES FROM A BODY IN A FLOW FIELD

FIELD OF DISCLOSURE

This invention relates generally to mobile source emission control methodologies, and more particularly, to methodologies for enhancing emission measurements including determining emission rates on mobile sources, for example, using remote sensing data to quantify emission rates of separate sources and their components from a body in a flow field.

BACKGROUND

In recent decades, government emission control efforts have focused on characterization, regulation, and control of vehicle emissions. The main categories of emissions from fossil-fueled (e.g., gasoline-fueled) vehicles are exhaust emissions, which are products of gasoline combustion, and evaporative emissions, which include evaporated gasoline. Exhaust emissions are released from vehicle tailpipes, and evaporative emissions can be released from any place on vehicles where gasoline or gasoline vapor is present. The exhaust and evaporative emissions of newly manufactured gasoline-fueled, light-duty vehicles are regulated separately on a mass-per-distance (grams/mile) basis and are usually regulated by government agencies such as the U.S. Environmental Protection Agency.

An early target of emissions work was light-duty vehicle exhaust emissions. The emissions behavior of a vehicle was determined by simulating on-road driving conditions by operating a vehicle on a laboratory chassis dynamometer (i.e., treadmill) while laboratory chemical analyzers measured exhaust emissions from the tailpipe. Laboratory measurements of evaporative emissions were also made, but evaporative emissions can be released from many locations on the vehicle besides the tailpipe. Thus, laboratory measurement and simulation of the influences of vehicle design, operating, and environmental factors on on-road evaporative emission rates are even more difficult and expensive to achieve than those for exhaust emissions. These difficulties have so greatly hindered full laboratory characterization of on-road evaporative emissions that the magnitude of the evaporative emissions inventory of the vehicle fleet is largely unknown.

Such in-laboratory exhaust and evaporative measurements necessarily only approximate the wide range of operating, aging, and maintenance scenarios that real, in-use vehicles face over their lifetimes. Consequently, open-path photometry instruments known as remote sensing devices (RSDs) were developed to measure emissions of vehicles on the road in routine operation. These cameras nonintrusively make many detailed, optical, remote measurements of pollutants surrounding each vehicle without stopping or touching the vehicle or alerting the vehicle driver. Current in-use RSDs include University of Denver's Fuel Efficiency Automobile Test (FEAT), Opus' Accuscan, and Hager Environmental and Atmospheric Technologies' (HEAT) Emissions Detection and Reporting (EDAR) system. FEAT and Accuscan sample emissions behind vehicles using a light beam that shines horizontally across a roadway lane about 8 to 12 inches above the pavement. EDAR samples emissions using a laser beam that scans the full width of the lane from above the roadway. Commonly reported gaseous emissions include hydrocarbon (HC), carbon monoxide (CO), nitric oxide (NO), and carbon dioxide ($CO_2$). Some RSDs also report measurements of particulate material (PM).

Known RSDs have algorithms applied to their detailed measurements to quantify each gasoline vehicle's exhaust emissions concentrations. These instruments report emissions as concentrations (ppm) and/or fuel-based emissions (kg pollutant per kg fuel) and assume that all emissions are exhaust emissions from the tailpipe. The inventors understand that while vehicles do emit exhaust gaseous and PM emissions from the tailpipe, they also emit HC gases from other locations on the vehicle. For gasoline-fueled vehicles, these other HC gases are generally attributed to evaporated gasoline derived from vented fuel tank vapor, leaking fuel line components, and leaking fuel vapor handling components.

Current remote sensing instrument (Current RSD) technology can measure exhaust emissions concentrations on gasoline-fueled vehicles and fuel-based emission rates (gram/gram of fuel) on gasoline- and diesel-fueled vehicles as they operate on the road. They measure emissions over a one-half second time frame and can measure several thousand vehicles per day. With their current algorithms, current RSDs cannot provide mass emission rates (e.g., gram/mile or gram/hour) of any type of emissions, and they cannot provide separate measurements of exhaust and evaporative emissions. Moreover, since the current RSD algorithms assume that evaporative emissions are not present, not only do they fail to measure evaporative emissions, they also calculate erroneous values for exhaust hydrocarbon concentrations. Evaporative emissions are made only of hydrocarbon vapor, and therefore cannot be described by a concentration. For evaporative emissions, the inventors found that mass emission rate (gram/mile or gram/hour) is the desired and meaningful quantity.

No RSD technology has been able to quantify evaporative emissions, which is regulated separately from exhaust emissions. In addition, no RSD technology has been able to quantify either exhaust or evaporative emissions on a mass-per-distance (gram/mile) basis, which is the regulatory basis for certifying the emissions performance of prototype light-duty vehicles. EPA currently certifies vehicle prototypes for meeting mass-per-distance-based (g/mile) emissions standards for exhaust emissions separately from evaporative emissions. Vehicles are not certified on a concentration basis or fuel-mass basis. Additionally, EPA models the emissions of on-road fleets on a mass-per-distance basis (g/mile) and on a mass-per-time (g/hr) basis. Thus, known RSDs reported emissions on a basis that was incompatible with vehicle certification, emissions standards, and fleet emissions modeling. Additionally, as noted above, the RSDs did not measure the separate contributions of exhaust HC and evaporative HC emissions.

No existing instrument or technique can remotely measure the mass emission rates of the separate exhaust and evaporative emissions of vehicles as they operate on the road. Remote measurement refers to nonintrusive measurement without touching or modifying the vehicle. Examples of mass emission rate measurements include grams/mile and grams/time unit measurement. Measurement of separately located emission points on the vehicle may include evaporative emissions from the fuel tank and exhaust emissions from the tailpipe. Emission measurements of vehicles as they operate on the road allow for real-world vehicle measurements within their intended operational conditions.

Portable Emissions Measurement Systems (PEMS) are known instruments that are installed on a vehicle to measure the vehicle's emissions. Companies that manufacture PEMS include Sensors, AVL, and Horiba. PEMS sample exhaust using a probe placed in the vehicle tailpipe and measure exhaust concentrations using chemical analyzers inside the PEMS. PEMS also measure flow rate using a flow-rate cell that is installed on the tailpipe. They collect vehicle speed data from the vehicle. From that information, PEMS calculate exhaust mass emission rates (e.g., gram/mile, gram/hour) while the vehicle is driving on the road. Because evaporative emissions can leak from any vehicle component that contains gasoline or gasoline vapor, even if dedicated sampling lines collect from expected leak locations, PEMS cannot guarantee that it is measuring all evaporative emissions. PEMS must be installed on the vehicle for operation, meaning emission measurements are not made remotely. Further, PEMS installation requires modification of the vehicle with permission of the vehicle's owner. While PEMS collect detailed, voluminous, and accurate emissions data on a single vehicle, only a tiny portion of the fleet can be measured practically.

Laboratories (Labs) can provide separate distance-based mass measurement of both exhaust and evaporative emissions. Vehicles are typically tested by driving them on a chassis dynamometer while following a speed-vs-time test cycle that approximates on-road driving. Exhaust emission rates are measured by sampling exhaust from the tailpipe and by continuously analyzing exhaust composition and flow rate. Evaporative emissions are emitted into the sealed chamber around the vehicle and dynamometer, where the emitted mass is measured by dedicated analyzers. Thus, Labs must use a dynamometer in a sealed vehicle enclosure, pollutant-measuring instruments, control and data collection systems, and a dedicated technical staff to operate. Such laboratory facilities are expensive to build, maintain, and operate. Even so, a laboratory can test only a few vehicles per day, and none of the tests are for real, in-use vehicles operating on real roads. Therefore, Laboratory emissions testing is not remote and can practically measure only a tiny portion of a fleet.

Infrared hyperspectral video cameras (IR video) can image emissions of gases that absorb infrared radiation. FLIR and Rebellion Photonics are companies known to manufacture infrared video cameras. Such systems can potentially estimate the time-based emission rates (e.g., gram/hour) of stationary sources, such as leaks from pipelines and refinery valves. Hyperspectral infrared video cameras (e.g., Rebellion Photonics) also have multi emission material capabilities, but they do not perform the processing steps needed to calculate emission rates from a moving vehicle or a series of moving vehicles in traffic and report mass emissions on a distance-travelled basis (e.g., gram/mile).

Historically, prior to the availability of the above systems, the only practical way to measure vehicle emissions was in the laboratory using a dynamometer. So, when the first RSD instrument was demonstrated, it was regarded as an especially useful tool since it could rapidly and remotely evaluate the emissions of thousands of vehicles per day on the road—their natural operating environment. For gasoline vehicles, exhaust concentrations were, and still are, calculated from the three ratios of the signals from hydrocarbon (HC), carbon monoxide (CO), and nitric oxide (NO) to carbon dioxide ($CO_2$). Those three ratios are constant for each vehicle transit, because all exhaust emission materials disperse together behind the vehicle. These three ratios are then applied to a balanced chemical equation (Eq.) for the stoichiometric combustion of gasoline to arrive at the concentrations of [HC], [CO], [NO], and [$CO_2$]. Because the goal of this calculation is to measure concentrations as opposed to emission rates, designers of these existing systems had no compelling reason or motivation to find an RSD method for calculating mass emission rates. Thus, examples of the invention provide solutions to problems that were never the goals of prior existing systems.

SUMMARY

The following presents a simplified summary in order to provide a basic understanding of some aspects of one or more embodiments or examples of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later. Additional goals and advantages will become more evident in the description of the figures, the detailed description of the disclosure, and the claims.

According to aspects described herein, examples apply a new blind source separation method to the component mass spatial array measurements to determine the separate emission rates and components of each of the body's sources. These analytical methods allow for the separation of vehicle emissions into exhaust and evaporative rates on a g/mile basis. The exemplary approaches also lower the emission detection limits significantly from established RSD manufacturers, allowing the measurement of cleaner vehicles. These overall improvements provide both locally and nationally a better vehicle fleet exhaust and evaporative emission profile that can be used in our modeling and regulatory efforts.

According to aspects illustrated herein, an exemplary method may use remote sensing device (RSD) pollutant absorbance measurements to look for evidence of multiple emission source locations on a vehicle. If multiple source locations are evident, the method may create multiple derivative sets of pollutant optical mass measurements with one set for each identified source location. Methods may use each derivative set of pollutant optical mass measurements for each identified source, with vehicle speed and characteristics of vehicle aerodynamics to calculate the vehicle's pollutant emission rate from each identified source location on the vehicle.

The foregoing and/or other aspects and utilities embodied in the present disclosure may be achieved by providing a system and method that a) calculate distance-based mass emissions rates (grams per mile) and/or time-based mass emissions rates (grams per hour), and b) calculate the separate mass emissions rates of evaporative emissions and exhaust emissions for a moving vehicle. According to aspects described herein, the exemplary system and method may measure a vehicle's emissions remotely, measure the emissions of a vehicle as it drives on the road, measure emissions on a mass-per-distance (grams per mile) basis and/or a mass-per-time (grams per hour) basis, separately measure exhaust and evaporative emissions even though those emissions are released from different places on the vehicle (e.g., tailpipe, fuel tank, a leaky fuel-injector under the hood), and separately measure particulate material (PM) emissions even though those emissions are released from different places on the vehicle (e.g., gasoline, diesel, and/or fossil-fuel combustion emissions from the tailpipe; tire PM emissions from individual tires; brake PM emissions from individual wheels).

This new approach uses remote sensing data to quantify emission rates of separate sources (exhaust and evaporative) and their components from a body in a flow field. The RSD unit is measuring the vortex field that is generated at the back of a vehicle where emissions are held and mixed with the ambient air. In examples, a method processes data obtained from remote sensing instruments that send a beam of light toward a reflecting surface through a flow field that surrounds a body having one or more emissions sources, acquires the scattered light at one or more wavelengths from the reflecting surface, and calculates component mass for many light-beam measurements in the spatial array of the flow field.

The term plume refers to a region in a flow field that contains a material released from a body in a flow field. When a vehicle drives on the road, it produces two overlapping plumes: 1) an exhaust emissions plume from the tailpipe, and 2) an evaporative emissions plume from elsewhere on the vehicle. Exhaust HC refers to hydrocarbon gas that is produced as a pollutant during combustion of a fossil fuel and is emitted from a vehicle's tailpipe. Exhaust HC, CO, NO, and CO2 come from the tailpipe. Evaporative HC refers to hydrocarbon gas that is produced by release of liquid gasoline or gasoline vapor, or by the release of other hydrocarbon vapor from other vehicle materials such as paint solvents. Evaporative HC specifically does not include exhaust hydrocarbon emissions from the tailpipe. Thus, Evaporative HC may come from fuel evaporating from the gas tank, fuel cap, fuel lines, fuel injectors, etc.

These combined new analytical methods will allow for the separation of vehicle emissions into exhaust and evaporative rates on a g/mile basis. These new methodologies will also lower the emission detection limits significantly from established RSD manufacturers therefore allowing the measurement of cleaner vehicles. These overall improvements should provide both locally and nationally a better vehicle fleet exhaust and evaporative emission profile that can be used in our modeling and regulatory efforts.

Exemplary embodiments are described herein. It is envisioned, however, that any system that incorporates features of apparatus and systems described herein are encompassed by the scope and spirit of the exemplary embodiments.

BRIEF DESCRIPTION OF THE DRAWINGS

Various exemplary embodiments of the disclosed apparatuses, mechanisms and methods will be described, in detail, with reference to the following drawings, in which like referenced numerals designate similar or identical elements, and.

DETAILED DESCRIPTION

Figure 1:
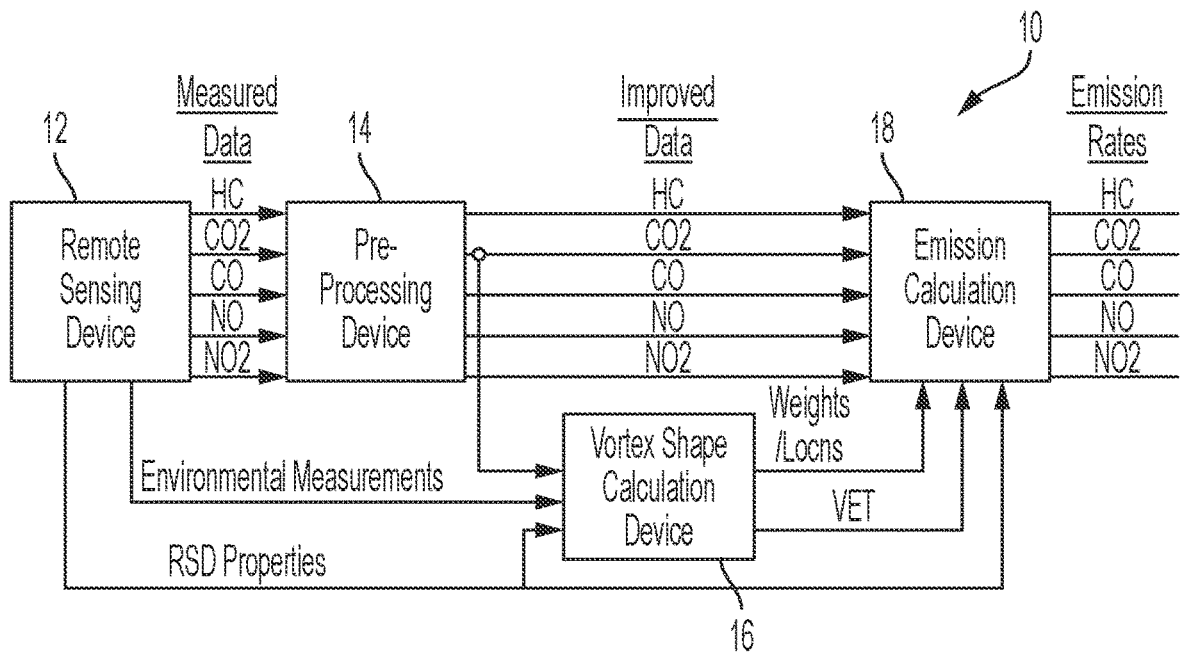
FIG. 1 is a block diagram of an exemplary emission detection system 10 for quantifying an object's mass emissions in accordance with examples of the embodiments.

Illustrative examples of the devices, systems, and methods disclosed herein are provided below. An embodiment of the devices, systems, and methods may include any one or more, and any combination of, the examples described below. This invention may, however, be embodied in many different forms and should not be construed as limited to the embodiments set forth below. Rather, these exemplary embodiments are provided so that this disclosure will be thorough and complete, and will fully convey the scope of the invention to those skilled in the art. Accordingly, the exemplary embodiments are intended to cover all alternatives, modifications, and equivalents as may be included within the spirit and scope of the apparatuses, mechanisms and methods as described herein.

We initially point out that description of well-known starting materials, processing techniques, components, equipment and other well-known details may merely be summarized or are omitted so as not to unnecessarily obscure the details of the present disclosure. Thus, where details are otherwise well known, we leave it to the application of the present disclosure to suggest or dictate choices relating to those details. The drawings depict various examples related to embodiments of illustrative methods, apparatus, and systems for remotely determining mass emission rates of emission material released from objects moving relative to a surrounding medium per unit time or relative unit distance.

When referring to any numerical range of values herein, such ranges are understood to include each and every number and/or fraction between the stated range minimum and maximum. For example, a range of 0.5-6% would expressly include the endpoints 0.5% and 6%, plus all intermediate values of 0.6%, 0.7%, and 0.9%, all the way up to and including 5.95%, 5.97%, and 5.99%. The same applies to each other numerical property and/or elemental range set forth herein, unless the context clearly dictates otherwise.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

An exemplary measurement of pollutant emissions rates by remote sensing device (RSD) may be based on three concepts identified by the inventors: 1) A portion of pollutants released from a moving vehicle become temporarily entrained in the vehicle's low-pressure zone, or vortex, which is the dominant source of RSD signals; 2) Under steady-state vehicle air velocity and pollutant release rate, the pollutant Mass in Vortex (e.g., g) is relatively constant and is proportional to pollutant release rate (e.g., g/hr); and 3) A proportionality constant, referred to herein as Vortex Entrainment Time (e.g., hr), depends only mildly on vehicle air speed, pollutant release location, and light-duty vehicle shape.

The pollutant Mass in Vortex may be determined from the RSD signal with adjustment as needed for road speed. The Vortex Entrainment Time (VET) may be estimated from the vehicle air velocity, the estimated vehicle dimension, and the estimated source location on the vehicle. Then, the pollutant Release Rate may be calculated as Mass in Vortex divided by VET. Finally, the inventors found that the pollutant Emission Rate (e.g., g/mile) correlates to the Release Rate (e.g., g/hr) divided by the vehicle Road Speed (e.g., mile/hr). The term "vehicle dimension" may refer to dimensions of the vehicle, and in examples may include the vehicle's size, shape and drag area. While the vehicle size, shape and drag area are discussed below in specific examples for helping to determine the VET, it is understood that these terms are mere examples of the vehicle's dimension used in association with the VET. In similar fashion, the term "object dimension" refers to dimensions of the object (e.g., vehicle) and may include the object's size, shape and drag area.

The calculations also may use the inventor discovered dependence of vortex shape on vehicle air velocity and vehicle length, as well as signal analysis techniques as understood by a skilled artisan, to improve RSD signal-to-noise ratio. In addition, Blind Source Separation may be used, for example, to apportion the RSD HC signal into an exhaust HC signal and an Evaporative HC signal, from which their separate emission rates are determined, as discussed in greater detail below.

Figure 2:
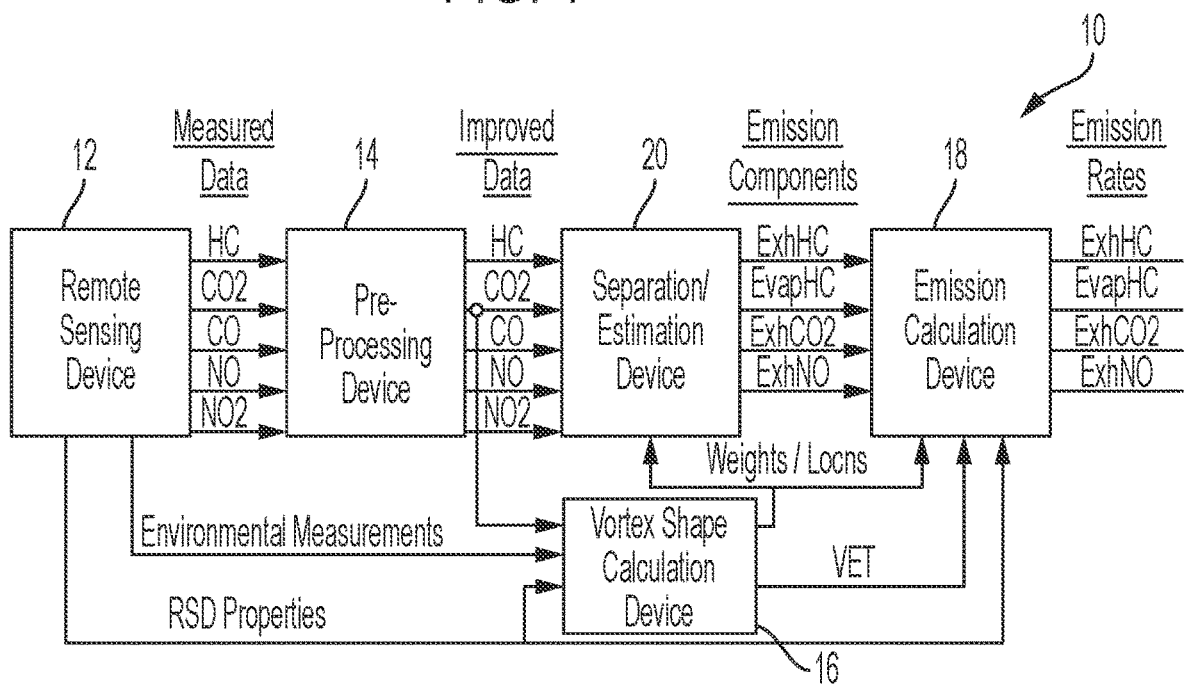
FIG. 2 is a block diagram of the exemplary emission detection system 10 for quantifying an object's mass emissions in accordance with specific examples of the embodiments.

FIG. 1 depicts an illustration of an exemplary emission detection system 10 for quantifying an object's mass emissions. The object includes a vehicle (e.g., car, truck, light-duty vehicle, heavy-duty vehicle, motorcycle, boat, airplane, jet) or other emission material releasing body moving through and relative to a compressible medium environment such as air or oxygen atmosphere. The emission detection system 10 may include a remote sensing device (RSD) 12, a pre-processing device (PPD) 14, a vortex shape calculation device (VSCD) 16, and an emission calculation device (ECD) 18. In examples the emission detection system 10 may also include a separation/estimation device (SED) 20 (FIG. 2).

The RSD 12 is configured to collect measurements of the emission materials, including gases, mixtures of gases, and particulate material, emitted from a moving vehicle as it passes by the RSD. In other words, the RSD 12 includes a sensor configured to measure a representative portion of the mass of one or more emitted materials surrounding an object in motion relative to a surrounding medium. The RSD 12 is configured to collect spatial and/or temporal representations of one or more emission materials that are potentially emitted from a moving vehicle as it passes by the emission detection system 10 without touching the vehicle. That is, the RSD 12 is configured to measure emission material pollutants (e.g., hydrocarbon (HC), carbon monoxide (CO), nitric oxide (NO), carbon dioxide ($CO_2$), particulate material (PM)) in the air around the moving vehicle without touching the vehicle or notifying the vehicle operator. The RSD 12 may also refer to a RSD system having an RSD instrument and associated instrumentation for defining vehicle, vehicle operation, and ambient conditions including determining vehicle license plate, road speed, and wind velocity.

In embodiments the RSD 12 is configured to perform numerous functions. For example, the RSD may measure a temporal signal corresponding to a single pollutant, such as $CO_2$, emitted from the vehicle over time. As another example, The RSD 12 may measure a two-dimensional image of two pollutants, such as $CO_2$ and HC, emitted from the vehicle in a snapshot picture. In certain examples, the RSD 12 may measure a two-dimensional video of one or more emission materials, such as an infrared camera. The RSD 12 may also measure two-dimensional representations of multiple emitted emission materials (e.g., $CO_2$, HC, CO, NO, $NO_2$, particulate material) using a scanning device as understood by a skilled artisan, where each measurement is associated with a specific space-time value. The RSD 12 includes a sensor configured to measure the spatial and/or temporal distributions of the masses of two or more emitted materials surrounding an object in motion relative to a surrounding medium.

Figure 3:
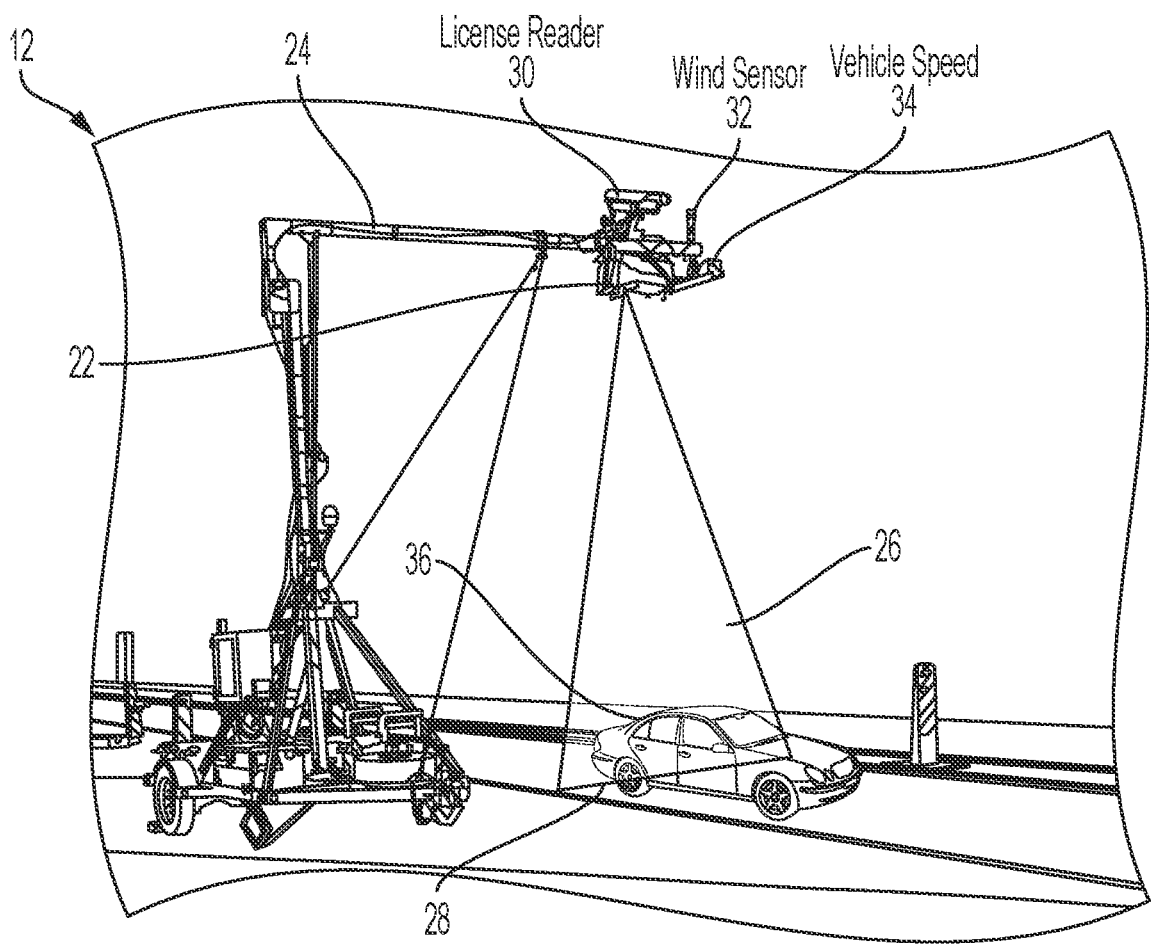
FIG. 3 is an exemplary remote sensing device having associated instrumentation in accordance with examples.

FIG. 3 illustrates an exemplary RSD 12 and associated instrumentation used to collect data to measure two-dimensional representations of multiple emitted emission materials (e.g., $CO_2$, HC, CO, NO, $NO_2$, particulate material) using a scanning device or sensor, where each measurement is associated with a specific space-time value. The RSD 12 scanning device/sensor includes a laser 22 (e.g., EDAR) and laser light reader that may be attached to the horizontal gantry boom 24. While not being limited to a particular scale, the path 26 of the scanning infrared laser is shown as about a 20 mm diameter infrared laser beam at 20 scans per second onto a retro-reflective tape 28 that may be attached to the pavement across a traffic lane perpendicular to the direction of traffic flow. The Retro-reflective tape refers to a surface-applied tape that reflects a substantial portion of incident light back toward the source of the light regardless of the angle of incidence. The laser light returns to the RSD 12 for analysis as gases emitted from vehicles absorb a portion of the light. The RSD 12 may provide HC, CO, NO, NO2, and CO2 optical mass (moles/m2) measurements for 256 pixels across the 3.66 meter (12 feet) long tape 28.

The horizontal gantry boom 24 may also include a license plate reader 30, a weather sensor 32 designed to measure wind speed and direction at about 6 meters above the pavement, and a vehicle speed sensor 34 designed to measure the road speed of each vehicle that passes under the RSD 12.

Figure 4:
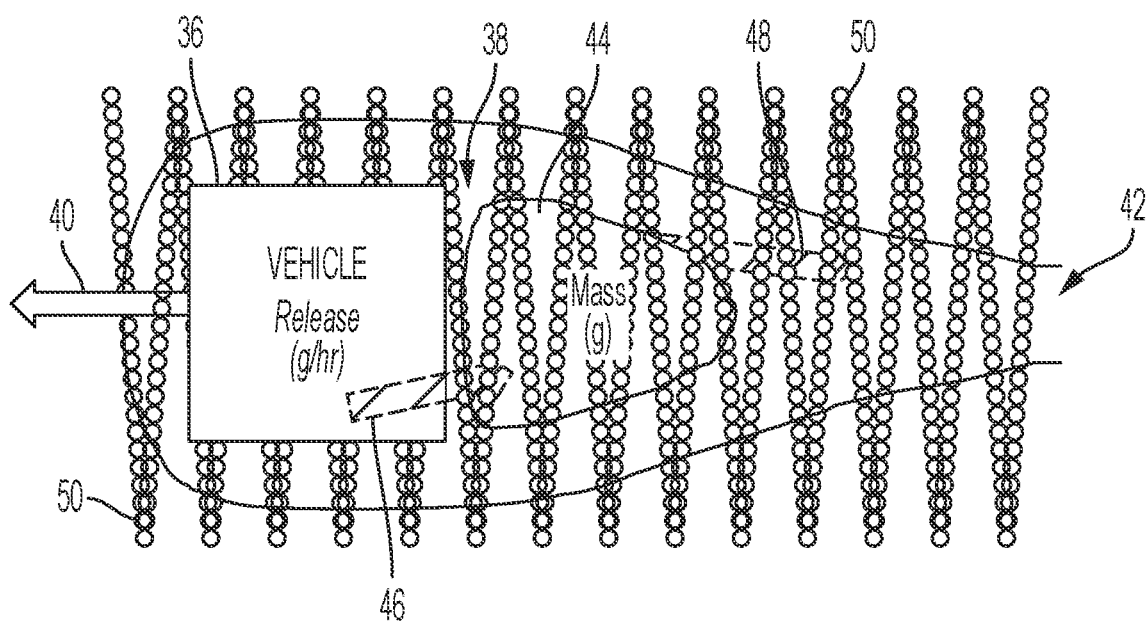
FIG. 4 is a top view illustrating an exemplary body having relative motion through a gas.

Referring now to FIG. 4, a body (e.g., vehicle 36) having relative motion through a gas (e.g., gaseous environment, air) may displace air around the body and form a low-pressure zone or vortex 38 behind the body. The term vortex refers to the low-pressure zone downstream of a body in a gaseous flow field. The vortex can act as a temporary storage region for emission materials released from the body. FIG. 4 depicts an exemplary vehicle 36 driving on a roadway along direction arrow 40, and the gas is ambient air. As the vehicle 36 travels down the road, vortex 38 follows the vehicle at the speed of the vehicle. The vortex 38 includes a dynamic, swirling, mass of gases and particles with ill-defined boundaries that exchanges material with the surrounding air moving past it.

Vehicles 36 may release pollutants from different locations, for example, the tailpipe, the fuel cap, or a fuel-injector on the engine. The vortex may temporarily store a portion of emitted pollutants. After a short time, referred to as turnover time or Vortex Entrainment Time (VET), pollutants are stripped from the vortex surface by air moving across it. In general, the mass of a pollutant in the vortex is proportional to the pollutant release rate. For example, if the vehicle's pollutant release rate (grams per hour) is large, then the mass of the pollutant (grams) in the vortex will be large. Release Rate (g/hr) thus refers to a time-based rate at which a species mass is released from a body in a flow field. Stated another way, the vehicle's pollutant release rate (grams per hour) corresponds to the mass in the vortex (grams) divided by the VET (hour).

The RSD 12 obtains signals using open-path photometric measurements of pollutants. While pollutants can be anywhere around the moving vehicle 36, the highest levels of pollutant mass are usually found in the vortex 38 because the vortex temporarily stores pollutants. While not being limited to a particular theory, the vortex 38 may be approximately as tall and as wide as the rear of the vehicle 36. The term wake refers to the region downstream of the vortex formed by a body in a flow field. In general, current RSD instruments do not have enough sensitivity to quantify emissions in the wake 42 behind the vortex 38. Thus, an RSD's signal is dominated by the mass of a pollutant 44 in the vortex.

Still referring to FIG. 4, if a pollutant is released from the vehicle 36, for example along arrow 46 at a mass per time (e.g., g/hr), a portion of the mass of the release is temporarily stored in the vortex 38. At the same time, air moving around the vehicle 36 and the vortex 38 strips off a portion of the pollutant mass from the vortex, with the stripped off portion shown by example as arrow 48 at a mass per time (e.g., g/hr). Under steady-state conditions, the release rate, the mass in the vortex, and the stripping rate are in a dynamic equilibrium. The stripping rate refers to the rate at which emission material is removed from a vortex by air that is passing over the surface of the vortex.

Consequently, on the average, the release rate from the vehicle equals the stripping rate from the vortex, and the mass in the vortex tends to be constant and proportional to the release rate. So, for example, if the pollutant release rate from the vehicle is zero, the pollutant mass in the vortex will tend to be zero.

As a vehicle 36 moves under the gantry boom 24, RSD 12 shines a beam of light through a portion of the air (e.g., laser path 26) surrounding the moving vehicle, including through the vortex 38. The RSD light beam may include different wavelengths of light to acquire pollutant-specific signals for emission materials (e.g., HC, CO, NO, CO2, PM). A reflector (e.g., reflective tape 28) returns the outgoing light back to the RSD 12 for analysis. The RSD compares intensities of the outgoing light and the returning light to determine optical mass (mole/square meter) at many individual locations in the air around the vehicle 36 where the light beam was shone. Optical mass (mole/m$^2$) refers to a RSD's fundamental measured quantity that is proportional to a species' mass per cross-sectional area of the RSD light beam. Because vehicle emissions tend to be temporarily stored in the vortex, the highest optical masses are generally found for the RSD's optical measurements in the vortex. All vehicles that are driven have this vortex behind them and the examples calculate the mass emissions in the vortex, and the vortex entrainment time to calculate a release rate (g/hour), which is the time-based rate at which a species mass is emitted from a body in a flow field.

FIG. 4 is a top view that also illustrates an example of the RSD's measurement collection pattern across the vehicle reference frame as small pixel dots or pixels 50 in zigzag formation. The vehicle reference frame refers to a coordinate system in which a vehicle is stationary and all things that are moving with respect to the vehicle are not stationary. In FIG. 4, the horizontal dimension is elapsed time, and the vertical dimension is the spatial position across the roadway. The motion of the vehicle 36 through RSD 12 scanning device causes a two-dimensional image-like measurement to be collected by the RSD for desired types of pollutants being assessed. Pixel 50 refers to a small location where the RSD makes a detailed optical measurement. A scan refers to a sequential series of pixels produced by the RSD when its light beam is moving in one direction. The small pixel dots 50 in FIG. 4 illustrate by example how the RSD's light beam scans the vehicle 36 and its vortex 38 from above as they pass under the RSD. Because the vehicle and its vortex are moving and the RSD is stationary, the light beam tends to make a zigzag in the vehicle/vortex reference frame. The dots 50 represent the pixels, which illustrate the spots where the RSD 12 makes each detailed data measurement. Detailed data refers to the raw data stream of optical mass species measurements collected by an RSD at individual pixels. At each pixel, the RSD records the optical mass (mole/m2) of a pollutant between the RSD and the pavement. Accordingly, the RSD 12 is configured to measure the masses of emission material HC, CO, NO, NO2, and CO2 at each pixel. Note that the RSD does not collect any detailed data while the vehicle 36 is covering the retro-reflective tape on the pavement. This is shown in FIG. 4 as the lack of small scanning dots 50 on top of the vehicle.

Measurements collected for the vehicle emissions task are assumed to be multichannel in nature. The data for the vehicle emissions task includes of sets of multiple registered images, collected simultaneously in a raster-scanning process using spatial scanning measurements using motion of a beam from a laser-based measurement system (e.g., RSD 12) over a roadway. Each image may include a collection of pixels 50 in which the horizontal dimension represents time and the vertical dimension represents position across the roadway. As a vehicle passes through the measurement system, the system measures the amount of emission materials present in the reflection of the laser beam at the sensor system. For example, the emission materials being monitored by the RSD 12 include hydrocarbons (HC), carbon dioxide (CO2), carbon monoxide (CO), and nitrogen oxides (NO, NO2), which are associated with five unique measurement channels, respectively. It should be noted, however, that the measurements are not limited to these five emission materials, nor is it limited to a system with five channels of data. Moreover, because the measurement process involves a scanning operation, the data can just as easily be indexed by time t, where the time variable can be converted to row-column via linear equations (Eqs.).

The focus of the measurement approach includes understanding the hydrocarbon emissions of a moving vehicle. The location of these emissions is an important key to understanding various parameters of the vehicle's operation, including the possibility of leaks or other performance-limiting behaviors of the combustion engine system. In addition, certain emission locations, such as the vehicle's tailpipe, will emit multiple gases, and thus the spatial extent of one emission type, such as CO2, may be highly correlated with that of another emission type, such as HC. For processing purposes, gases emitted from the same location typically have the same spatial signature. Moreover, the inventors found that due to the optical measurement process, these spatial signatures are linear and additive where the plume emissions overlap. Thus, we have the following linear model, $$x(t) = As(t) + n(t) \qquad (\text{Eq. 1})$$

where $$x(t) = [x_1(t) x_2(t) x_3(t) x_4(t) x_5(t)]^T$$

denotes the vector of five measurements of HC, CO2, CO, NO, and NO2 collected at time t, $$s(t) = [s_1(t) s_2(t) s_3(t)]^T$$

denotes the vector of three different spatial signatures indexed by emission location at time t, and $$A = \begin{bmatrix} a_{11} & a_{12} & a_{13} \\ a_{21} & a_{22} & a_{23} \\ a_{31} & a_{32} & a_{33} \\ a_{41} & a_{42} & a_{43} \\ a_{51} & a_{52} & a_{53} \end{bmatrix}$$

denotes the matrix of coefficients that map the amount of each spatial signature to the resulting data channel collected by the measurement system. The coefficient $\alpha_{ij}$ corresponds to the proportionality constant associated with the spatial signature emitted from Location j as measured in the ith channel at measurement time t. Note that t corresponds to measurement position in the collected images, not the location where a particular gas has been emitted. Finally, there is additive noise and artifacts in each channel, which is denoted by the noise vector $$n(t) = [n_1(t) n_2(t) n_3(t) n_4(t) n_5(t)]^T$$

where "T" denotes the transpose of a vector. For purposes of the model, the spatial signatures have some normalization associated with their scale. For example, each signature has the same signal power or some other unit measure of area or volume, e.g., the temporal average of each signature is one.

Referring back to FIGS. 1 and 2, the PPD 14 is configured to adjust RSD 12 measurements to improve their overall quality and reduce noise effects. These improvements include constant-level offset adjustments to all measurements of a single emission material to remove biases; identifying outlier measurements and omitting them from processing; filtering of the measurements to remove non-physical noise components such as tonal disturbances and striping artifacts; and adjusting the spatial location of the measured data points to a regular rectangular grid using interpolation techniques. Both statistical and spatial structure of the data is used in this stage, as described below. The resulting outputs are improved versions of the original data measurements, broken out by measurement type, e.g., HC, CO2, and NO, among possible others.

In this processing, each channel of data is treated as a statistical measurement with an assumed constant value or offset when no emission material is present. Thus, the measured value consists of a measured mixed signal, an additive noise signal, and a possible constant offset value. To determine the value of the constant-offset value for this channel of data, the PPD 14 may first form a histogram of the values within the channel, denoted as p(bin), where bin denotes the range of bin values corresponding to the overall range of values in the original measured signal, such that each p(bin) value is the count of values within each bin. Assuming that the number of measurements in the channel is large, the spatial extent of the measured mixed signal is small, and the additive noise is Gaussian-distributed, the PPD 14 may take the logarithm of the histogram p(bin) and plot it as a function of the bin values in bin. The peak of this plot will correspond to the bin value that is nearest the constant offset value. The PPD 14 may solve for the quadratic function of p(bin) versus bin to determine this offset value in the range of bin, and then adjust all of the values in the measured signal to remove this offset value from them. This also results in an estimate of the variance of the noise in the channel using the curvature of the quadratic fit of the p(bin) versus bin values, which is used for outlier estimation as may be described in greater detail below.

After Offset Removal, the signal may still contain large values that are non-physical in nature due to erroneous operations within the RSD. Typically, these outlier values are found near the vehicle due to erroneous light reflections caused by the vehicle's shape as it is scanned by the RSD. To identify these values, the PPD 14 looks for large values that exceed a predetermined threshold value near the pixel positions identified by the RSD 12 to be vehicle pixels. The logic for this detection is as follows: A pixel must exceed a threshold value. If it does, then the following conditions must also be true: the adjacent pixel next to this pixel (either left or right) must be a vehicle pixel AND the pixel on the other side of this pixel must not exceed a threshold; OR both the adjacent pixel next to this pixel AND the pixel in front of this pixel occurring earlier in measurement time must be vehicle pixels.

While not being limited to a particular value, a threshold value for the detection may be about 1.96 times the noise standard deviation as determined in the Offset Removal step. It is understood that a skilled artisan would be able to adjust the detection threshold according to assumed Gaussian probability values. After this step, the values in the measured signal channels are largely free of outliers due to vehicle pixel artifacts.

The RSD Signal (g) refers to the mass of emission materials reported by an RSD in the sample of a vortex that the RSD illuminates. As measured, the RSD signal may contain periodic disturbances due to the mechanical nature of the measurement scanning process. Such periodic disturbances are non-physical and are unrelated to the mass measurements being collected. To reduce these noise artifacts, the following exemplary processing may be performed. First, the measured data in each channel may be examined as a one-dimensional signal, corresponding to the sequence of pixels 50. Then, a power spectrum of this signal is computed using standard frequency-domain processing as understood by a skilled artisan, wherein (a) the data is divided into blocks and windowed using a Hamming window, (b) the Fast Fourier Transform (FFT) of each windowed data block is computed, and (c) the magnitudes of the FFT values for each frequency bin are averaged across the data blocks. A tonal noise signal will app ear in the data as a peak in the power spectrum, and the frequency of this peak is determined from the frequency bin value where the peak occurs, denoted as estfreq. This value is then used in a two-pole, two-zero digital infinite impulse response (IIR) filter with the form:

$y[n]=x[n]+2\cos(\text{estfreq}*\pi)\{0.95\ y[n-1]-0.99\ x[n-1]\}+\{0.95^2\ x[n-2]-0.99^2\ y[n-2]\}$, where $x[n]$ is the measured input signal, and $y[n]$ is the processed output signal for each measured channel. Other frequency estimation and linear filtering techniques may be available as suitable for the RSD 12, as understood by a skilled artisan. After filtering, the signal is arranged into its zigzag pattern for further processing.

It is understood that the measured data pixel 50 locations as shown in FIG. 4 are not on a regular two-dimensional grid, and thus any estimation of physical quantities based on these positions might distort the mass estimates based off of them. To reduce these distortions, the measured data is interpolated to a rectangular grid, where the pixel 50 positions represent the input to the interpolation process, and a corresponding set of rectangular grid points corresponding to pixel positions that are evenly spaced in time across the transit are used as output locations for the interpolation process. The interpolation is performed in the dimension corresponding to the direction of vehicle travel, thus corresponding to a one-dimensional interpolation of the data; the dimension transverse to the direction of vehicle travel is not adjusted nor interpolated.

After this interpolation is performed, a two-dimensional array of measurements for each channel indexed by scan position m and scan number n is obtained, where m corresponds to the position across the road and n corresponds to the passage of time along the road. These measurements for each measurement channel using a vector representation for position and indexed by scan number value n may be defined as:

$$x_n = [x_{1,n}, x_{2,n}, \ldots x_{M,n}]^T$$

where M is the number of positions measured in a single scan and the range of n corresponds to an appropriate time slot before the vehicle has arrived at the RSD 12 to an appropriate time slot after the vehicle has passed the RSD. Note that this representation still corresponds to the linear model in Equation 1 (Eq.1) above. In examples described in greater detail below, the signal $x(t)$ for $t=1$ to $t=L$ may correspond to all of the interpolated measurements for a particular channel through an appropriate assignment from t to the pair (m,n). For example, if there are N scan numbers, this assignment is $$\{x(1), x(2), \ldots, x(L)\} = \{x_{1,1}, x_{2,1}, \ldots, x_{M,1}, x_{1,2}, x_{2,2}, \ldots x_{M,N}\}$$

Still referring to FIGS. 1 and 2, the VSCD 16 is configured to calculate Weights and Vortex Entrainment Time (VET) parameters to aid in the estimation of emission rates. Weights refers to spatial factors assigned to spatial coordinates in a vortex that describe the anticipated relative mass distribution of species emitted from a body in a flow field. The VSCD 16 is configured to characterize the expected shape of the vortex for each vehicle as it drives past the RSD 12. These characteristics are needed to calculate vehicle emission rates from the RSD vortex mass measurements of emission components as shown in the flow diagrams of FIGS. 1 and 2. The inputs include the improved $CO_2$ data array, measured road speed and direction, estimated vehicle size properties, RSD 12 measurement characteristics, wind speed and direction, and estimated terrain surface roughness. Road speed refers to the speed of a vehicle with respect to the road surface. Road direction refers to the direction (e.g., with respect to north) that a vehicle or traffic is moving on a road. Wind speed and direction refer to the speed and direction (e.g., with respect to north) of wind as measured by an RSD system. The outputs of the VSCD 16 may be estimated for each vehicle transit, which refers to an event in which a vehicle passes by a RSD. The general outputs include identification of the data location index of the front and rear of each vehicle; Weights that characterize the expected relative magnitude of emissions at locations in the vortex 38; and the Vortex Entrainment Time (VET) expected for the vortex. The VET is understood as a proportionality constant that expresses the ratio of the mass (g) of a released emission material in the vortex to the release rate (g/hr) from a body in a flow field.

Figure 5:
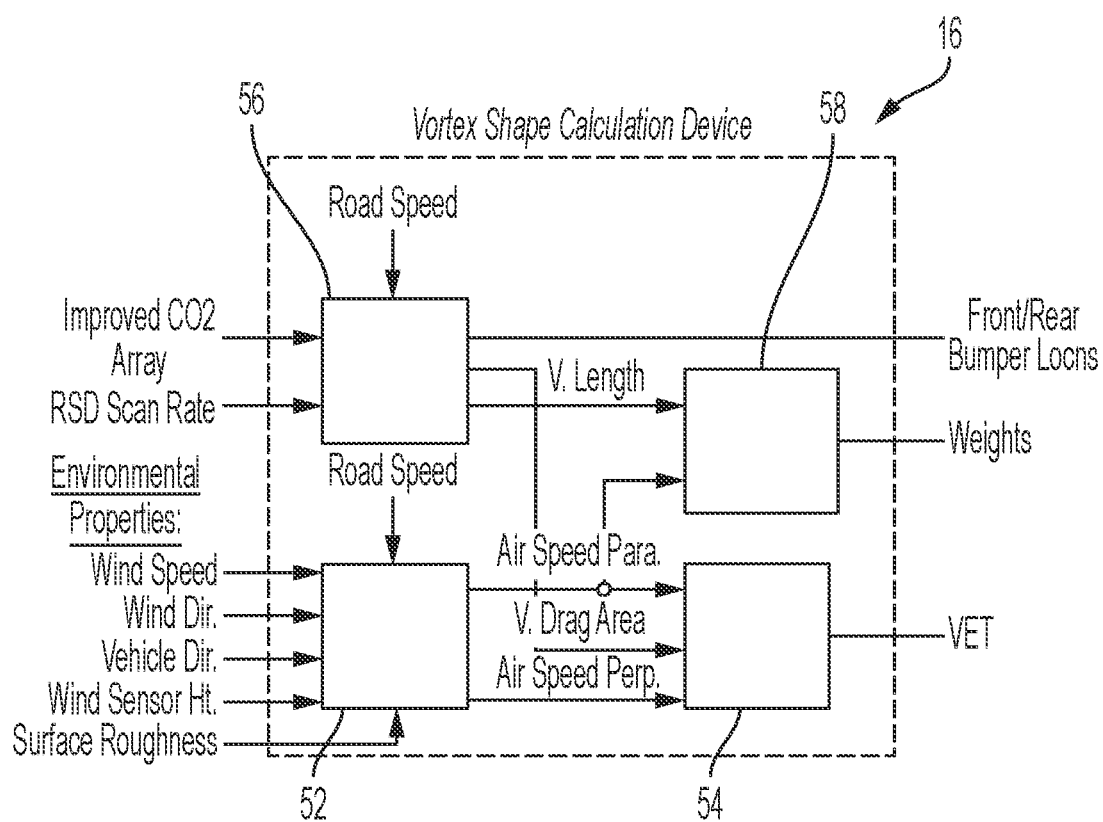
FIG. 5 is a diagram illustrating exemplary elements of a vortex shape calculation device (VSCD)

FIG. 5 is a flow diagram illustrating elements of the VSCD 16. In examples, the VSCD includes an air speed calculation device 52, a VET calculation device 54, a vehicle characteristics device 56 and a weight calculation device 58.

The air speed calculation device 52 is configured to calculate the air speed of the vehicle at the height above the pavement where the vortex forms. The shape of the vortex is more closely influenced by the vehicle air speed, that is, the speed of the air moving across the vehicle and its vortex, than the vehicle road speed. The air speed may refer to the speed of a vehicle at a height (e.g., 1 meter) above the roadway with respect to the air surrounding the vehicle at a substantial distance from the vehicle. As can be seen in FIG. 5, the inputs to the air speed calculation device 52 include a measured road speed and direction, a measured wind speed and direction at the wind sensor, a height of the wind sensor above the pavement, a desired height of the calculated air speed and direction above the pavement, and an estimated terrain surface roughness. Outputs of the air speed calculation device 52 include components of the air speed parallel (AirSpeed Para) and air speed perpendicular (AirSpeed Perp) to the direction of vehicle movement at the desired height above the pavement. The AirSpeed Para refers to the scalar air speed component parallel to the direction of vehicle motion at a height (e.g., 1 meter) above the roadway surface. The sign convention is positive for air moving toward the windshield. The AirSpeed Perp refers to the scalar air speed component perpendicular to the direction of vehicle motion at a height (e.g., 1 meter) above the roadway surface. The sign convention is positive for air moving toward the left side of the vehicle.

The Danish Wind Industry Association relationship can be used to estimate the wind speed at one height from wind speed measurements made at another height:

$$v = v\_ref * \ln(z/z_0) / \ln(z\_ref/z_0) \quad \text{(Eq. 2)}$$

where:

v=wind speed at height z (meters) above the ground v_ref=measured wind speed at a height z_ref (meters) above the ground z=height (meters) above the ground for the desired wind speed v $z_0$=terrain surface roughness length (meters) in the current wind direction, with examples provided in Table 1 below. Surface roughness influences the wind speed profile at different heights above a roadway.

TABLE 1

Terrain Surface Roughness Length Examples

| $z_0$ Terrain Surface Roughness Length (m) | Surface Description |
|---|---|
| 0.0024 | Concrete runways, mowed grass. |
| 0.03 | Open agricultural area without fences and hedgerows with very scattered buildings. Soft-rounded hills. |
| 0.055 | Agricultural land with some houses and 8 m tall hedgerows about 1250 m apart. |
| 0.1 | Agricultural land with some houses and 8 m tall hedgerows about 500 m apart. |
| 0.2 | Agricultural land with many houses, shrubs and plants, or 8 m hedgerows about 250 m apart. |
| 0.4 | Villages, small towns, ag land with many or tall sheltering hedgerows, forests, and very rough and uneven terrain. |
| 0.8 | Larger cities with tall buildings. |
| 1.6 | Very large cities with tall buildings and skyscrapers. |

For example, the RSD 12 measures the wind speed and direction at about 6 meters above the pavement. In the example, the calculated wind direction may be the same as the measured wind direction. The wind speed measurements may be applied to the Danish Wind Industry Association relationship, Equation 2 (Eq. 2), to estimate the wind speed at about 1 meter above the pavement, which is an exemplary height where vehicle vortexes 38 may be formed.

The vehicle air speed vector at 1 m height may be calculated from the wind speed vector at 1 m height and the vehicle's road speed vector using vector algebra as understood by a skilled artisan:

$$AS = RS - WS \qquad (Eq.\ 3)$$

where AS=Air Speed vector at 1 m elevation referenced to North heading

RS=Road Speed vector referenced to North heading

WS=Wind Speed vector at 1 m elevation referenced to North heading

The Air Speed vector at 1 m elevation may be resolved into air speed components parallel and perpendicular to the direction of vehicle motion, where • denotes the dot product for vectors and $\|\cdot\|$ denotes the length of a vector.

RP = Perpendicular vector to Road Speed vector $$RP = \begin{bmatrix} 0 & 1 \\ -1 & 0 \end{bmatrix} RS$$

$$AirSpeed\ Para = (AS \cdot RS)/\|RS\| \qquad (Eq.\ 4)$$

$$AirSpeed\ Perp = (AS \cdot RP)/\|RP\| \qquad (Eq.\ 5)$$

In examples, the estimation of the Vortex Entrainment Time (VET) by the VET calculation device 54 may be helpful for measuring pollutant emission rate using RSD 12, as the VET establishes a connection between the RSD-measured pollutant mass in the vortex 38 and both the pollutant release rate (g/hr) and pollutant emission rate (g/mile). The VET is influenced by the efficiency of entrainment of emissions released from the vehicle into the vortex, and the volume of the vortex. For light-duty vehicles 36 driving at around 30 mph, in certain examples VET may typically equal about 4 seconds. It is understood that VET may be the same or different for other vehicles 36 (e.g., car, truck, light-duty vehicle, heavy-duty vehicle, motorcycle, boat, airplane, jet, other emission material releasing body). More accurate VET values may be estimated using measured vehicle road speed and direction, measured wind speed and direction, vehicle drag area, and location of the emissions source on the vehicle. A more detailed discussion of the VET and its associations require discussion of quantities to be described in greater detail below. Therefore, VET will also be discussed in greater detail below.

The vehicle characteristics device 56 is configured to estimate the vehicle drag area and to use the RSD improved $CO_2$ measurements to identify the data location index of the front and rear of each vehicle and the length of each vehicle. The drag area may be used to improve the estimate of the VET, and refers to the product of a vehicle's aerodynamic drag coefficient and the vehicle's frontal area. The frontal area refers to the area of the silhouette of a vehicle as viewed from the front of the vehicle.

The Data Location Index refers to a scan or pixel in the data stream that corresponds to a transit event, such as the passing of the front or rear of a vehicle. The data location index of the front and rear of each vehicle are used to time-align the improved RSD data arrays with the vortex weights that characterize the expected relative magnitude of emissions at locations in the vortex. The front and rear vehicle locations are in turn used to calculate vehicle length, which also influences the vortex weights.

Inputs to the vehicle characteristics device 56 include the measured vehicle road speed, the improved $CO_2$ array, and the RSD scan rate. Outputs of the vehicle characteristics device 56 include the last scan before the front of the vehicle 36, the first scan after the rear of the vehicle, vehicle length, and vehicle drag area.

The data location indexes of the front and rear of each vehicle are determined by examining the pixels where the outgoing RSD laser beam is not reflected back to the RSD 12 since the laser beam is occluded by the vehicle 36 as exemplified by the missing pixel dots 50 in FIG. 4. In the example illustrated in FIG. 4, the last scan before vehicle front is scan 2 (e.g., second line of pixel dots from left), and the first scan after vehicle rear is scan 11 (e.g., eleventh line of pixel dots from left).

The length of the vehicle may be determined by:

$$Length = \frac{(FirstScanAfterVehicleRear - LastScanBeforeVehicleFront - 1) * Road\ Speed * 5280\ ft/mile}{(RSD\ Scan\ Rate * 3600\ s/hr)} \qquad (Eq.\ 6)$$

where Length=Vehicle length (ft)

FirstScanAfterVehicleRear=First full scan after the vehicle rear

LastScanBeforeVehicleFront=Last full scan before the vehicle front

Road Speed=Vehicle road speed (mile/hour)

RSD Scan Rate=Rate that RSD scans the vortex (scans/s)

The Drag Area is Given by:

$$Drag\ Area(ft2) = C_D * FrontalArea \qquad (Eq.\ 7)$$

where $C_D$ = Coefficient of drag

FrontalArea = Frontal Area of the vehicle (ft²)

A default drag area of 10 ft² may be used for light-duty vehicles. Other approaches may be used to provide a more precise value for drag area, as understood by a skilled artisan. For example, the RSD license plate reader 30 (FIG. 3) may be used with a state vehicle registration database to look up vehicle year, make, and model, which can be used in turn to look up specific drag areas for many vehicles.

Another approach to estimate drag area may be to use the size of the vehicle footprint as provided in the improved CO2 data array produced by the RSD 12. Footprint may refer to the contiguous group of RSD pixels with missing detailed data values that are produced when the outgoing RSD beam is blocked by the vehicle body. As can be seen in FIG. 4, when a vehicle 36 passes under the RSD 12, the laser beam is not returned to the RSD. This lack of returned light produces blank pixel values in each RSD pollutant array that appear in the data image as a footprint or shadow of the vehicle as viewed from above the roadway. Longer vehicles make longer footprints, and wider and/or taller vehicles produce wider footprints. Vehicles that have large vehicle footprints tend to have larger drag areas. Therefore, in certain examples, drag areas can also be estimated by:

$$\text{Drag Area(ft}^2\text{)} = 0.22 * \text{Footprint Width(ft)} * [\text{Footprint Length(ft)}]^{0.72} \quad \text{(Eq. 8)}$$

where

Footprint Width (ft) = the width of the vehicle footprint as imaged by the RSD

Footprint Length (ft) = the length of the vehicle footprint as imaged by the RSD The Weights Calculation Device (WCD) 58 is configured to provide weights that reflect the probable distribution of relative emissions mass in the vortex. The weights may be used by the Emission Calculation Device 18 as a distribution to which RSD measurements of any pollutant are fit to determine the mass of emissions in the vortex while enhancing the signal-to-noise ratio and thereby improving the method detection limit of the pollutant emission rate. The weights are also used by the Separation/Estimation Device 20 to better assign RSD-measured pollutant mass to separately located pollutant sources.

Inputs to the Weights Calculation Device include the vehicle length, which is determined from the Vehicle Characteristics Device 56, and the AirSpeed Para (e.g., 1 meter), which is determined by the Air Speed Calculation Device 52. Output of the Weighs Calculation Device 58 include a set of weights as a function of time after the rear of the vehicle.

The weights can be expressed in terms of three factors: time after the vehicle rear, vehicle length, and AirSpeed Para:

$$\text{Weight} = \text{Time-Decay Factor} * \text{Length Factor} * \text{AirSpeed Factor} \quad \text{(Eq. 9)}$$

Figure 6:
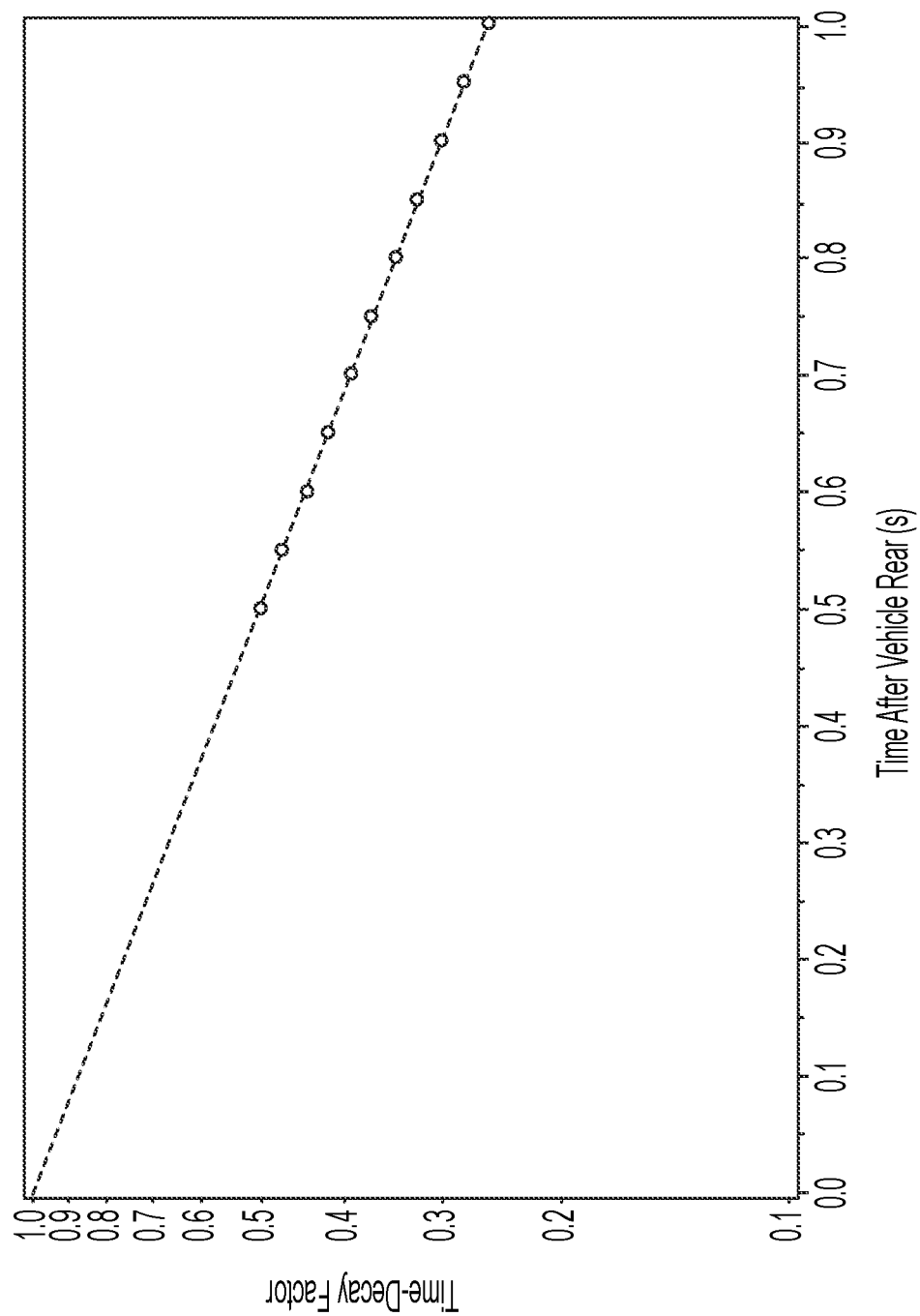
FIG. 6 is a graph illustrating Time-Decay Factor as a function of time after a vehicle rear according to examples.
Figure 7:
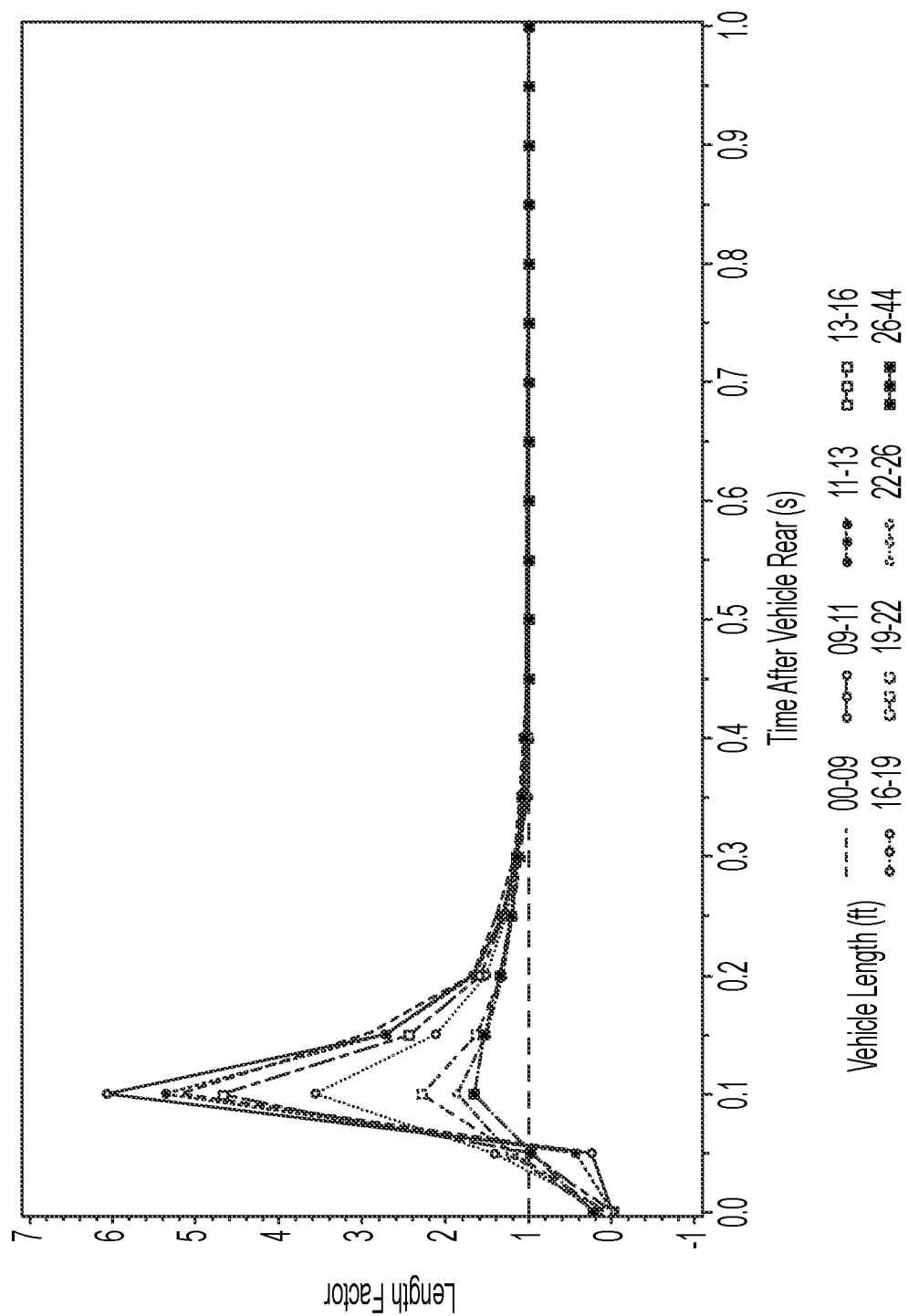
FIG. 7 is a graph illustrating Length Factor as a function of time after a vehicle rear according to examples.
Figure 8:
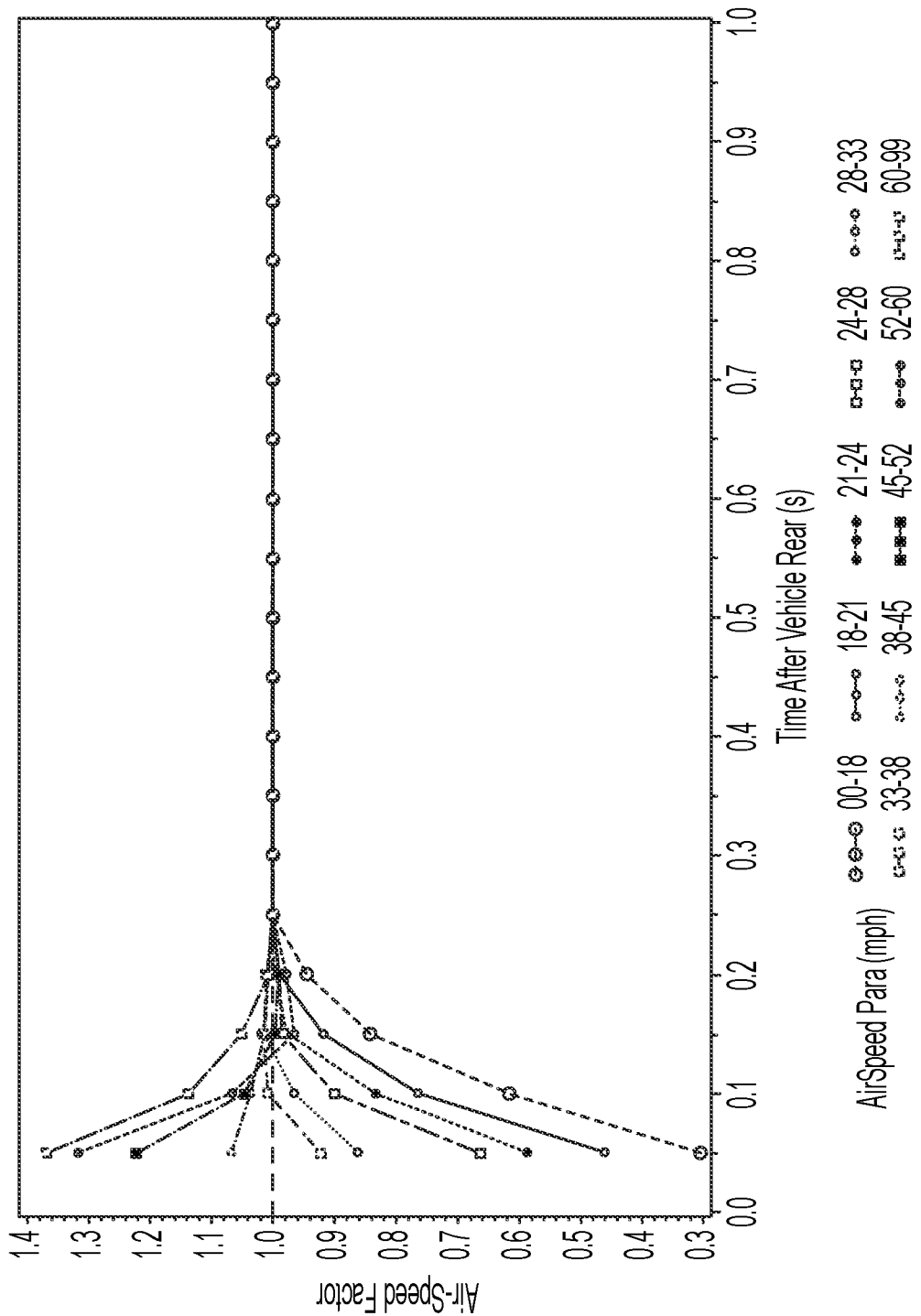
FIG. 8 is a graph illustrating Air-Speed Factor as a function of time after a vehicle rear according to examples.
Figure 9:
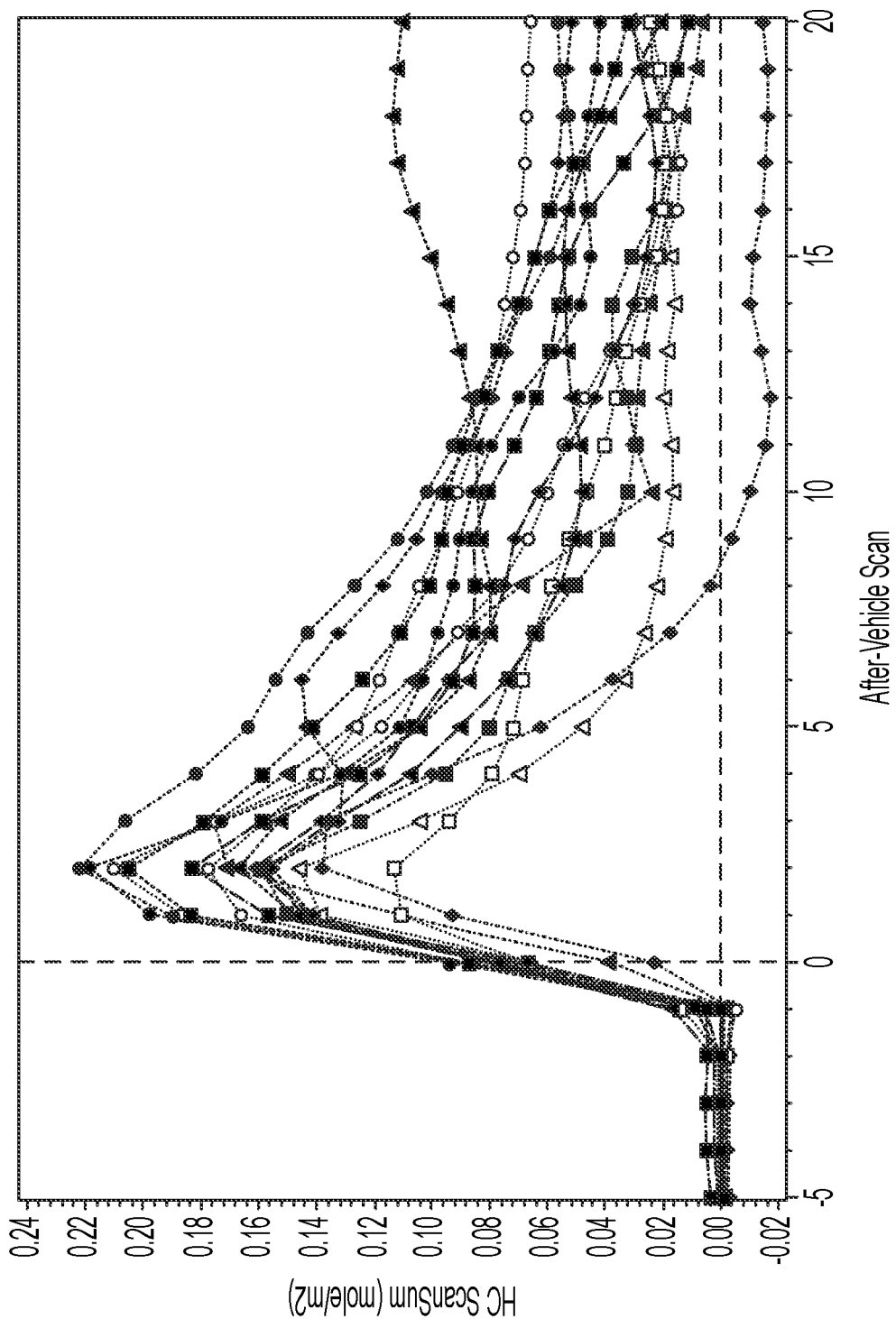
FIG. 9 is a graph illustrating HC scansum time traces according to examples.
Figure 10:
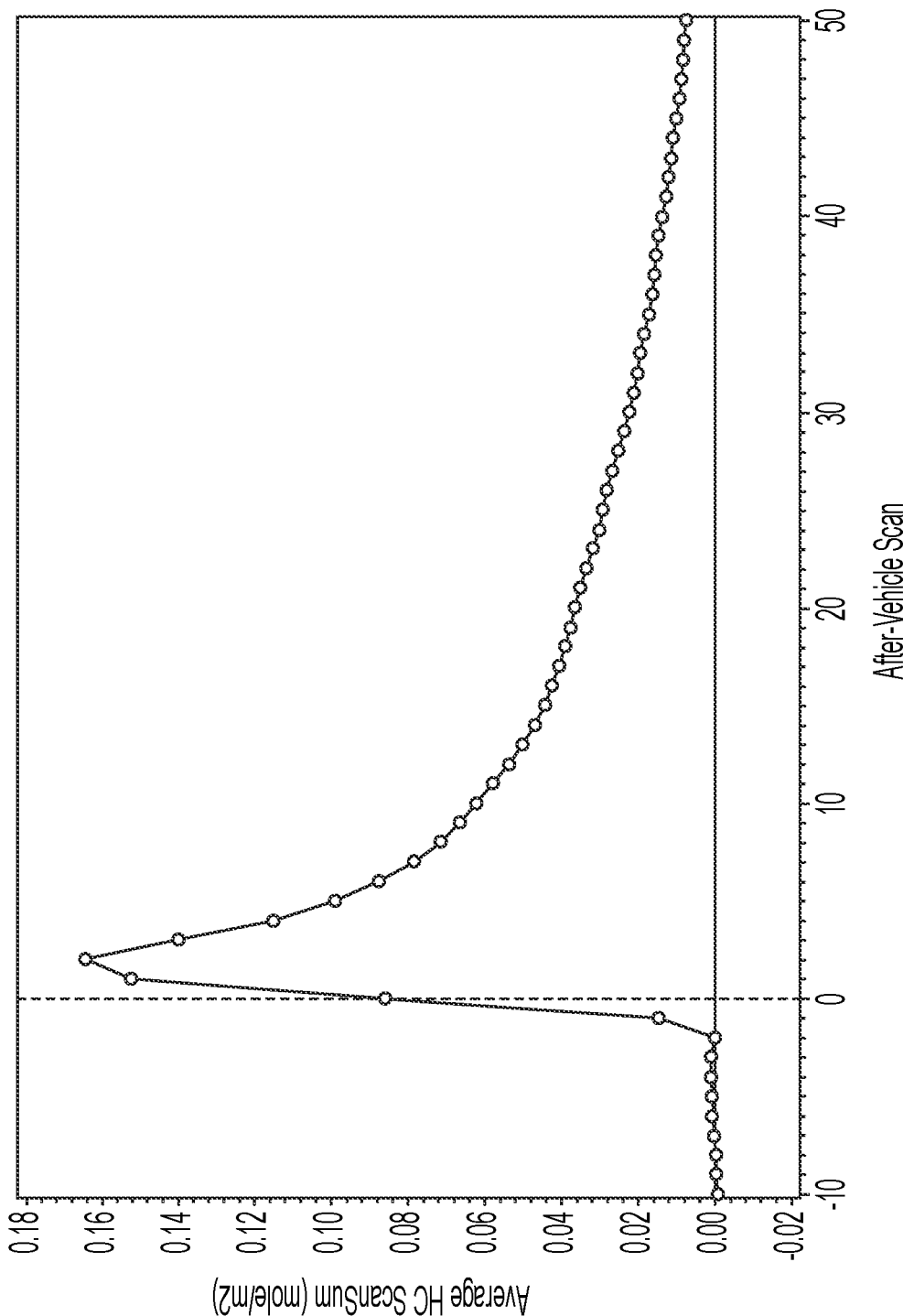
FIG. 10 is a graph illustrating average HC scansum time traces on a linear scale according to examples.
Figure 11:
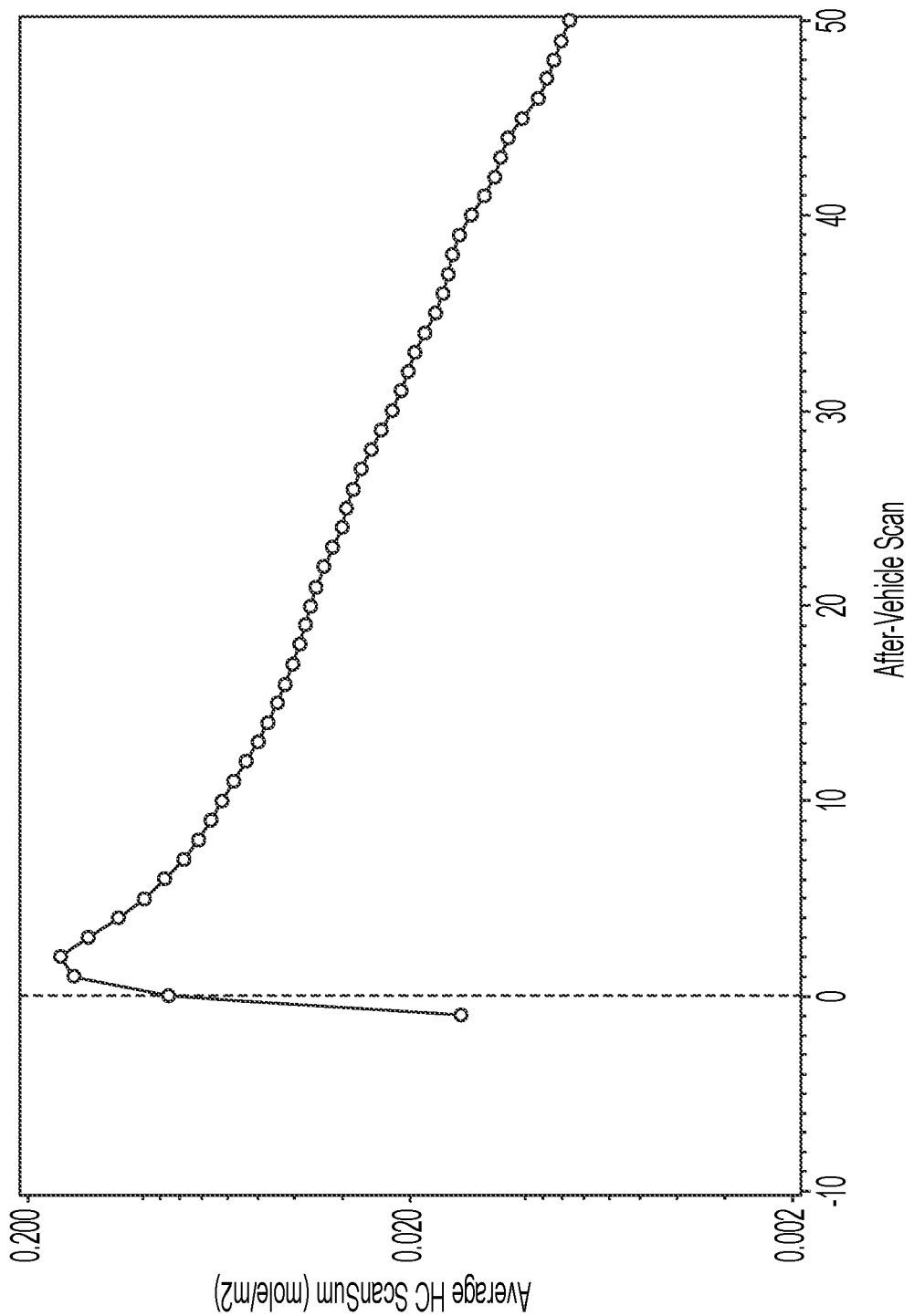
FIG. 11 is a graph illustrating average HC scansum time traces on a log scale according to examples.
Figure 12:
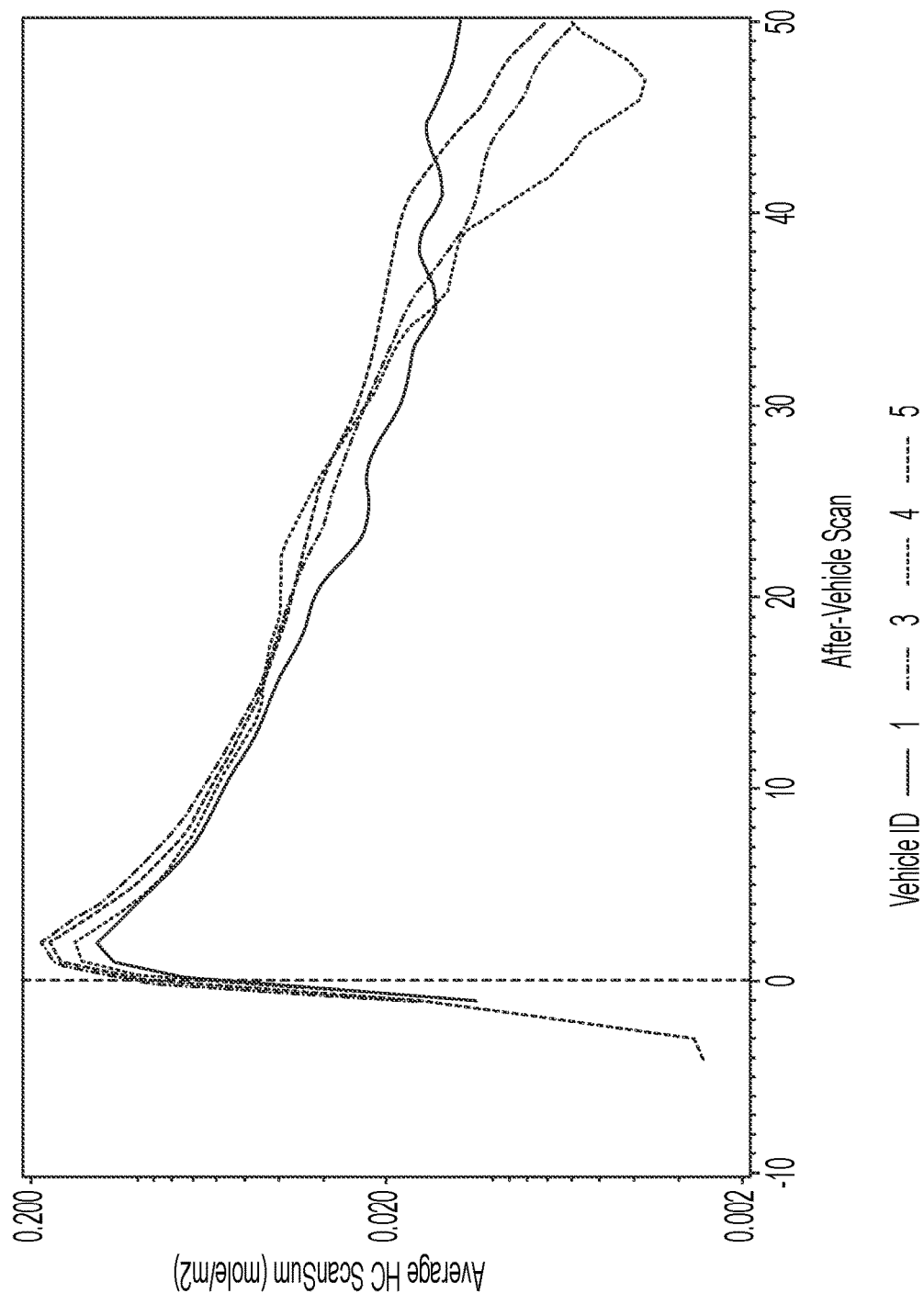
FIG. 12 is a graph illustrating average HC scansum time traces for different vehicles on a log scale according to examples.
Figure 13:
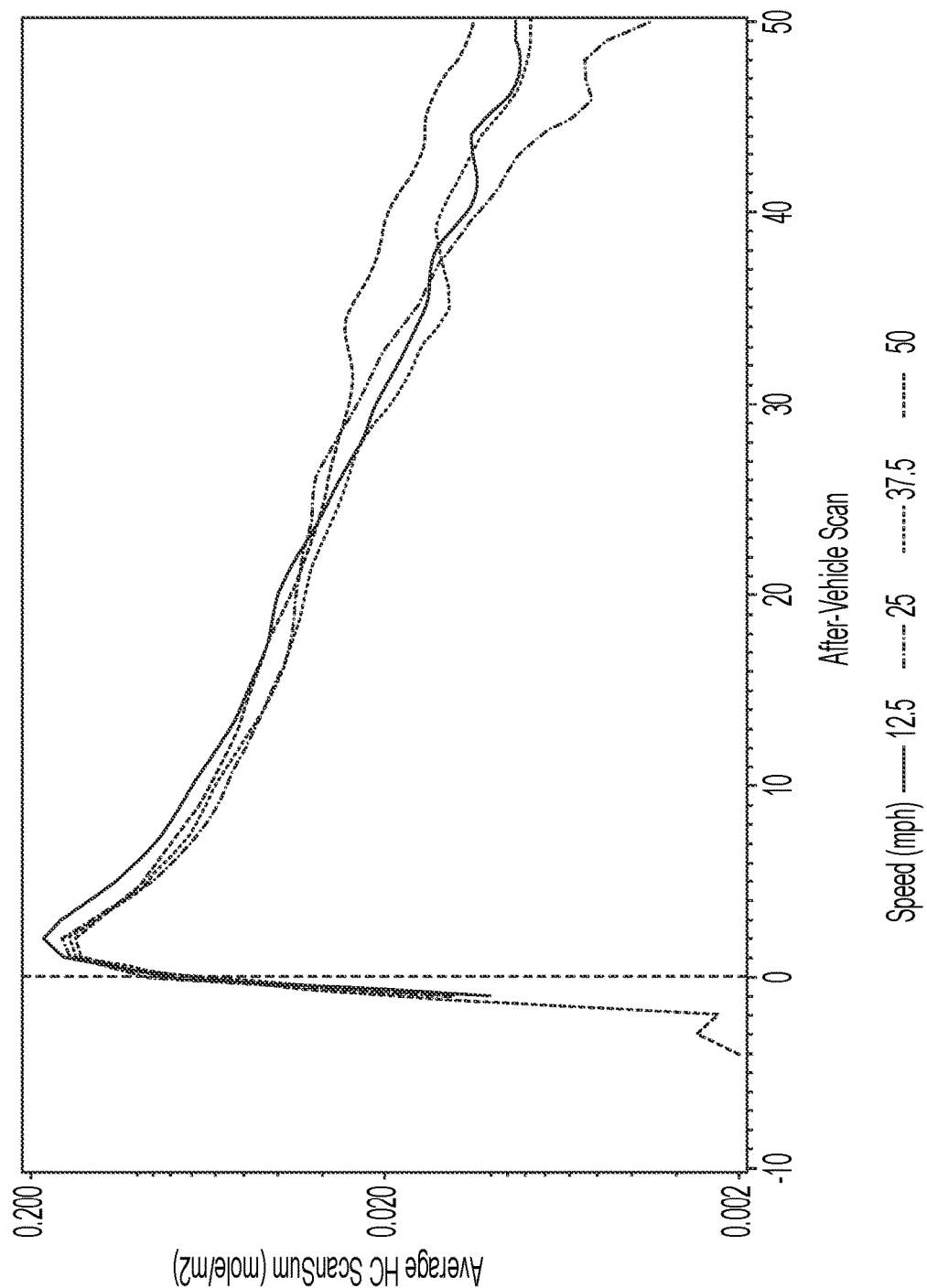
FIG. 13 is a graph illustrating average HC scansum time traces for different vehicle speeds on a log scale according to examples.
Figure 14:
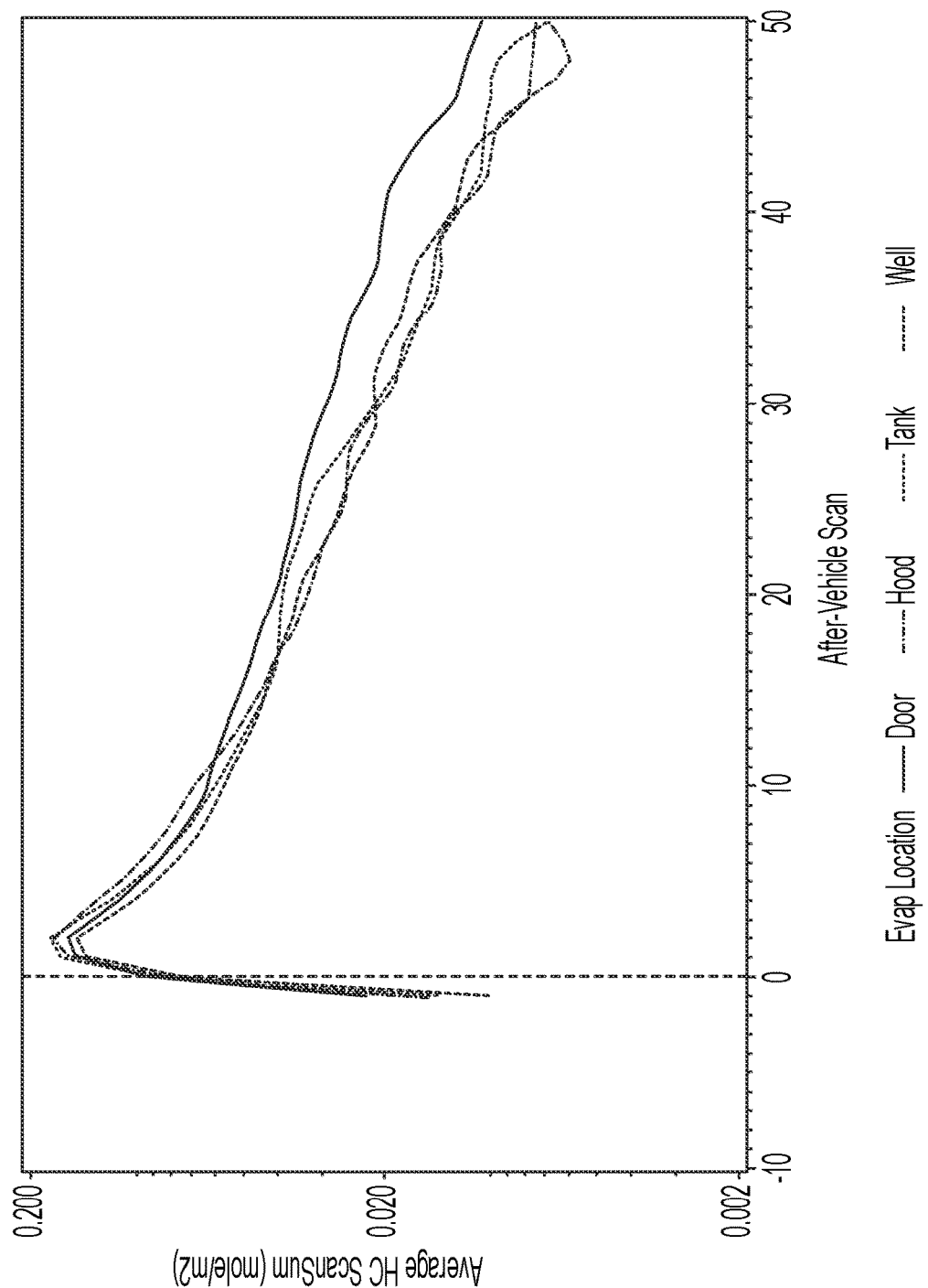
FIG. 14 is a graph illustrating average HC scansum time traces from different vehicle emission release locations on a log scale according to examples.
Figure 15:
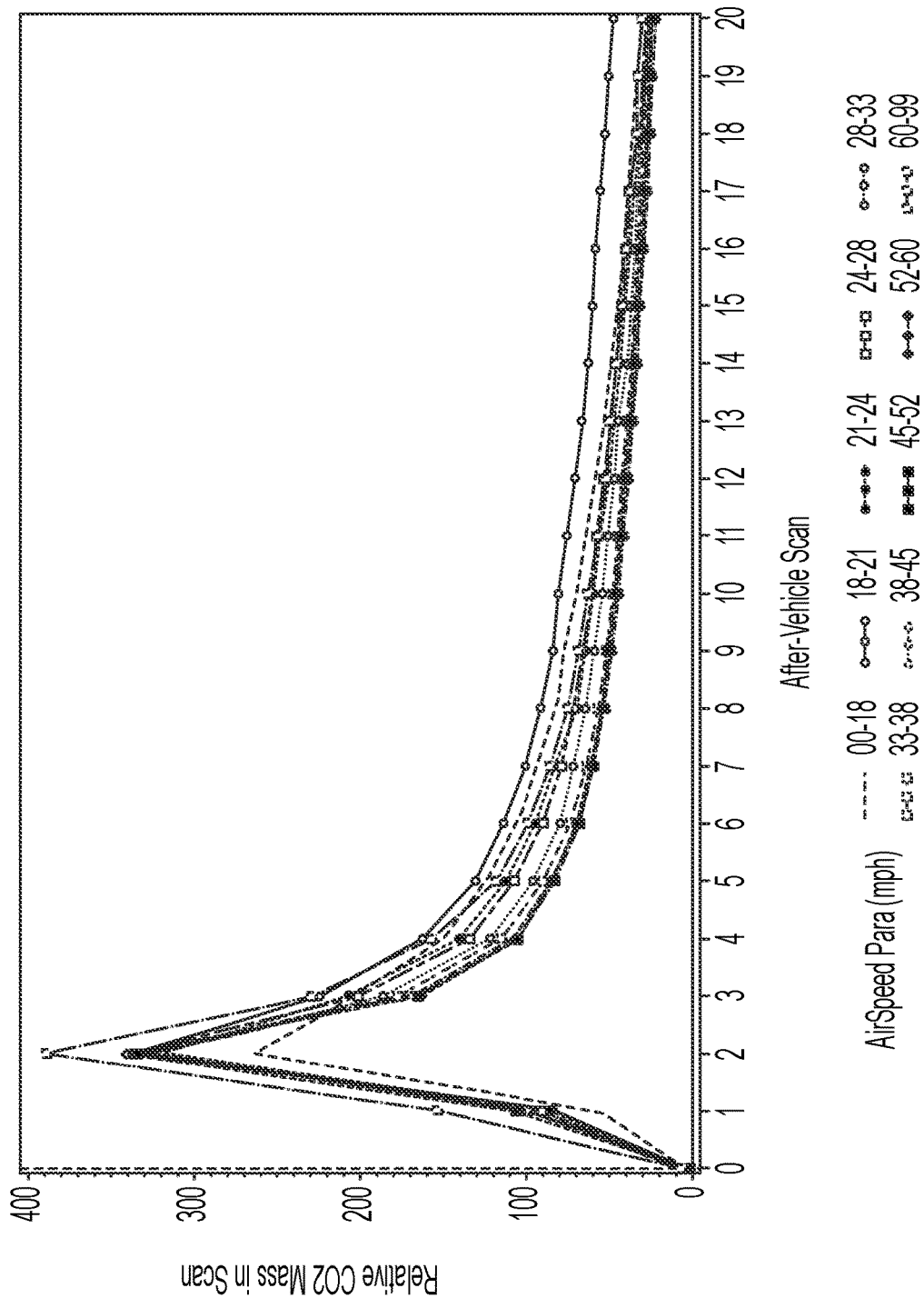
FIG. 15 is a graph illustrating exemplary average relative CO2 mass time traces in bins of AirSpeed Para plotted on a linear scale.
Figure 16:
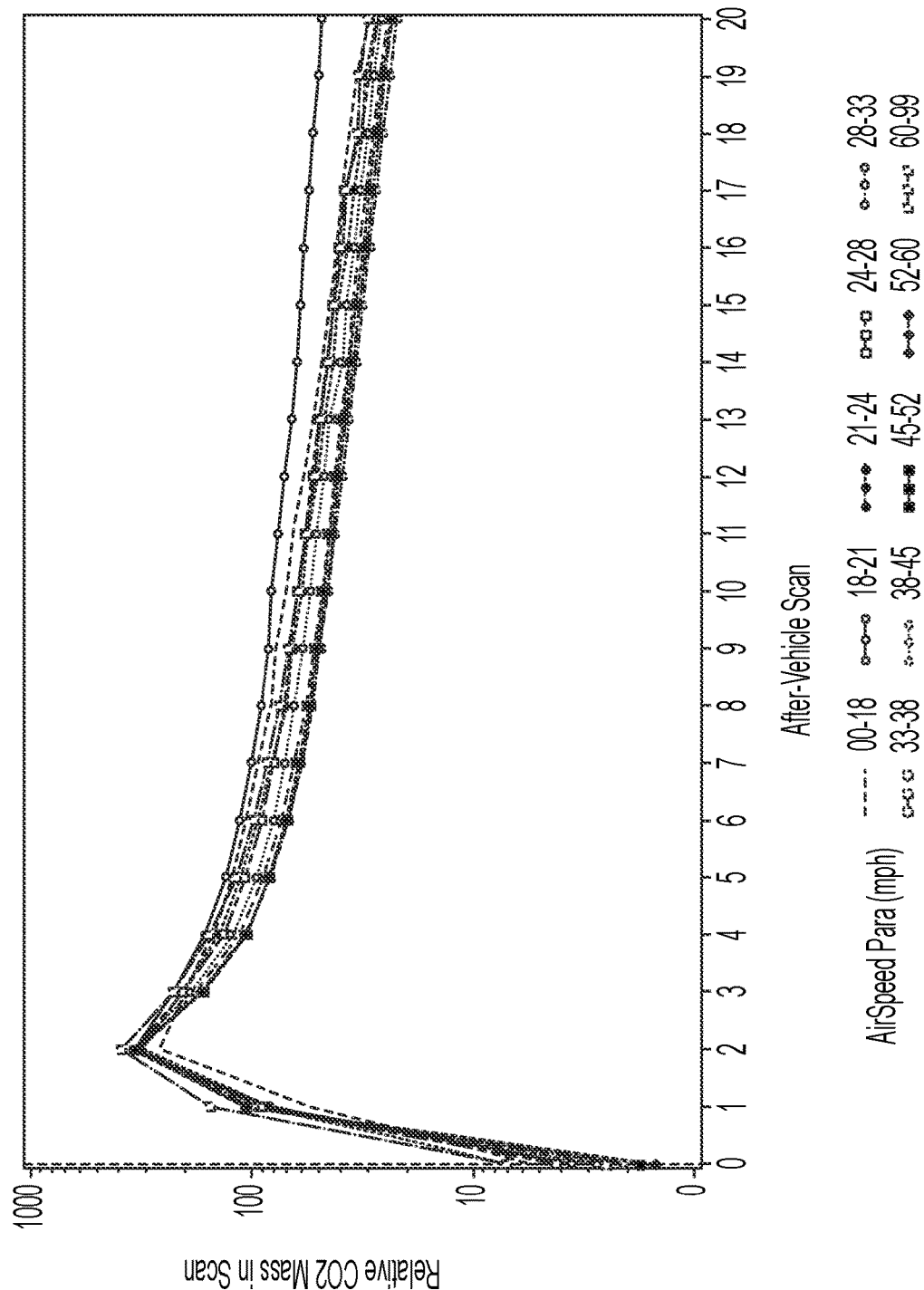
FIG. 16 is a graph illustrating exemplary average relative CO2 mass time traces in bins of AirSpeed Para plotted on a log scale.
Figure 17:
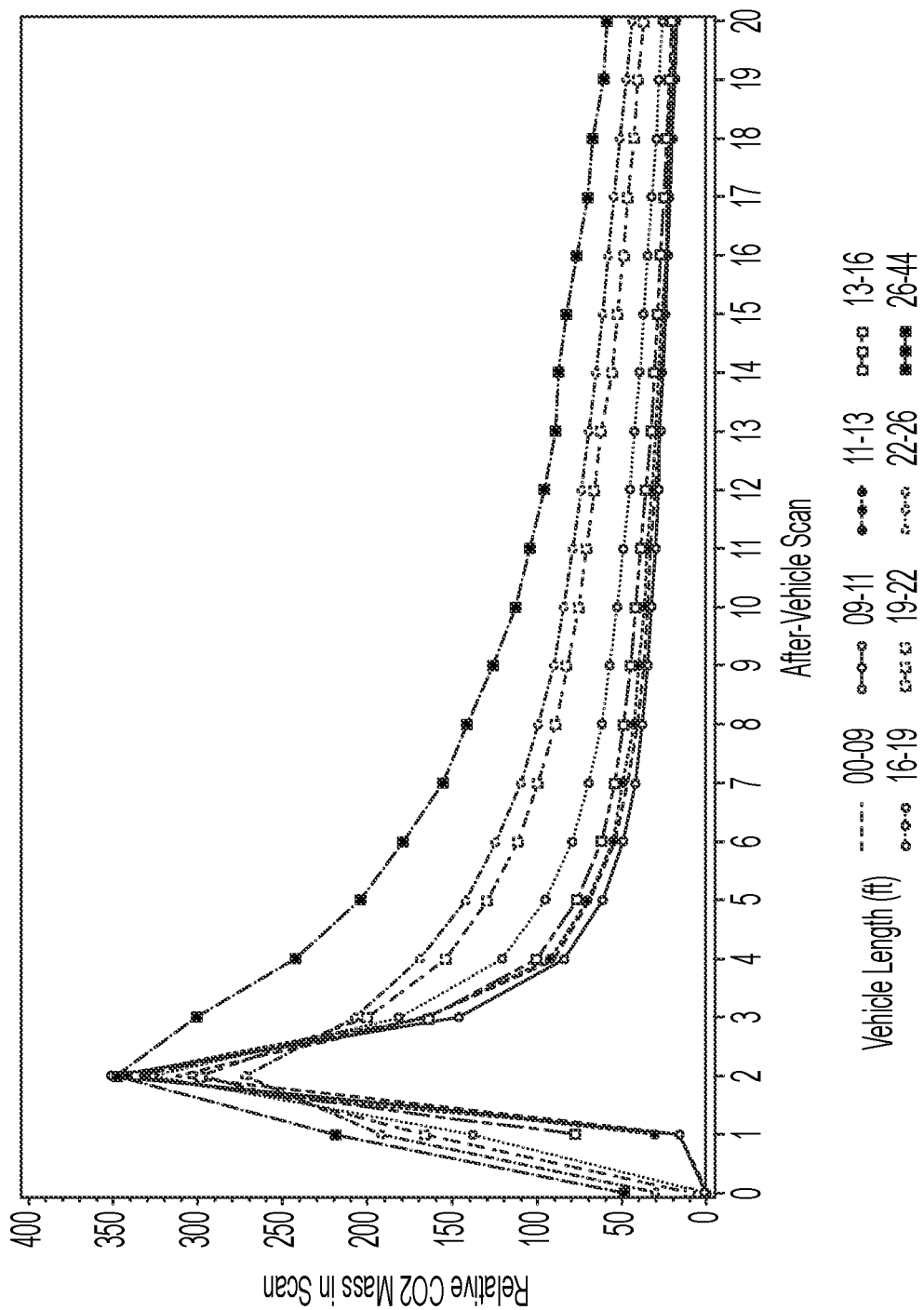
FIG. 17 is a graph illustrating exemplary average relative CO2 mass time traces averaged by vehicle Length bin on a linear scale.
Figure 18:
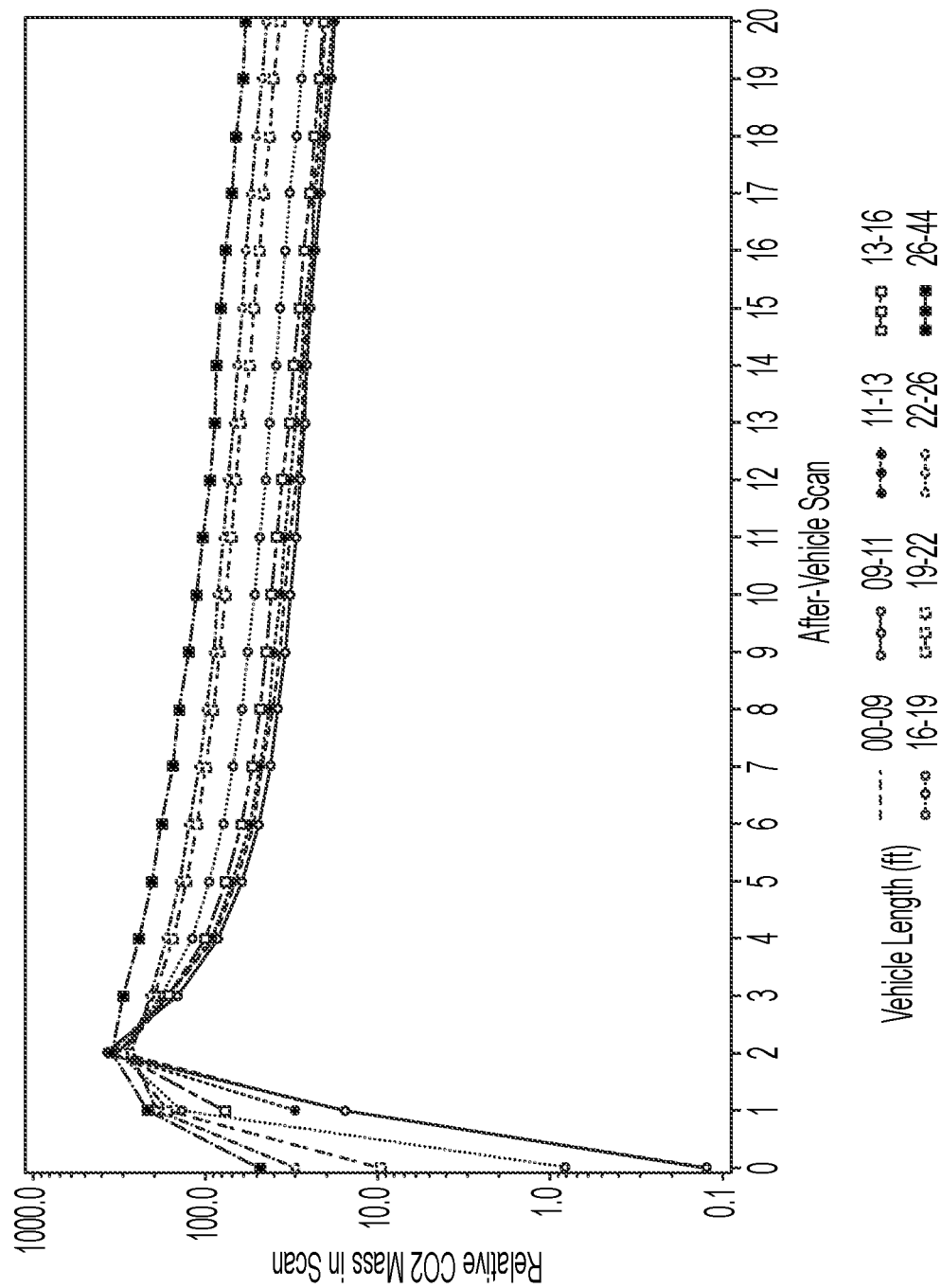
FIG. 18 is a graph illustrating exemplary average relative CO2 mass time traces averaged by vehicle length bin plotted on a log scale in accordance with examples.

Associations of the three factors are illustrated in FIGS. 6-8. The Time-Decay Factor is shown by example in FIG. 6 as a function of time after the vehicle rear. As can be seen in FIG. 6, the time-decay factor is an almost perfect exponential decay.

The Length Factor for a vehicle with a 40 mph AirSpeed Para is shown by example in FIG. 7 is a function of time after the vehicle rear and the vehicle length. As can be seen in FIG. 7, after about 0.5 seconds after the vehicle rear, the factor has a value of 1, which indicates that vehicle length has no influence after 0.5 seconds after the vehicle rear. The different curves for vehicle length indicate that the peak at 0.1 seconds is large for short vehicles and decreases and approaches 1 for longer vehicles.

The Air-Speed Factor is shown by example in FIG. 8 as a function of time after the vehicle rear and for values of AirSpeed Para that differ from 40 mph. As can be seen in FIG. 8, after about 0.25 seconds after the vehicle rear, the factor has a value of 1, which indicates that AirSpeed Para has no influence after 0.25 seconds after the vehicle rear. For times shorter than 0.25 seconds, FIG. 8 indicates that AirSpeed Para less than about 40 mph are associated with air-speed factors less than 1, and AirSpeed Para greater than about 40 mph are associated with air-speed factors greater than 1.

According to the exemplary illustrations of FIGS. 6-8, after about 0.5 s after the vehicle rear, the product of the three factors depends almost entirely on the exponential time-decay factor shown in FIG. 6. At shorter times after the vehicle rear, the influences of vehicle length and air speed may make substantial modifications to the decay.

The region at short times after the vehicle corresponds to the region close behind the vehicle rear where the vortex has the largest mass of pollutants. The RSD gets a large part of its signal from this region. Therefore, the weights for vehicle length and airspeed in this region may be important to achieving accurate emissions rate measurements with good detection limits.

While the values for the three factors that contribute to the weight could be read from the examples of FIGS. 6-8, a convenient set of parameterizations of the curves in the figures may be provided via Equations 10-12 below. The parameterization covers vehicle lengths from about 10 to 27 feet and AirSpeed Para values from about 16 to 67 mile/hr.

$$\text{Time-Decay Factor} = \exp(K * t) \quad \text{(Eq. 10)}$$
$$\text{where } K = -1.38 \text{ s}^{-1}, \text{ for high altitudes}$$
$$-1.38 \text{ s}^{-1}, \text{ for standard altitudes near sea level}$$
$$t = \text{Time after the vehicle rear (s)}$$

$$\text{Length Factor} = 1 + \text{FastDecay} + \text{RampCorr} \quad \text{(Eq. 11)}$$
$$\text{where FastDecay} = \exp(\text{Length\_Intercept} + \text{Length\_Slope} * t)$$

$$\text{Length\_Intercept} = -0.0388 * \text{Slope} - 2.2568$$
$$\text{Length\_Slope} = 0.5211 * \text{Length (ft)} - 23.662$$

-continued $$
\begin{aligned}
\text{Length (ft)} &= 10.0, \text{ for } \mathit{LengthBin} = 00\text{–}09\\
&= 10.0, \text{ for } \mathit{LengthBin} = 09\text{–}11\\
&= 11.9, \text{ for } \mathit{LengthBin} = 11\text{–}13\\
&= 14.2, \text{ for } \mathit{LengthBin} = 13\text{–}16\\
&= 17.3, \text{ for } \mathit{LengthBin} = 16\text{–}19\\
&= 21.5, \text{ for } \mathit{LengthBin} = 19\text{–}22\\
&= 24.0, \text{ for } \mathit{LengthBin} = 22\text{–}26\\
&= 27.0, \text{ for } \mathit{LengthBin} = 26\text{–}44
\end{aligned}
$$

$$
\begin{aligned}
\text{where } \mathit{RampCorr} &= (1 + \exp(\text{Length\_Intercept})) * \text{Ramp}\\
\text{Ramp} &= -1.000, \text{ for } t = 0\\
&= -0.410, \text{ for } t = 0.05\\
&= 0.030, \text{ for } t = 0.10\\
&= 0, \text{ for } t > 0.0125
\end{aligned}
$$

$$
\text{Air–Speed Factor} = 1 + \text{Air\_Intercept} * \exp(-18.8260 * t) \quad \text{(Eq. 12)}
$$

$$
\text{where Air\_Intercept} = 2.4720 - \exp(\exp(0.7716 - 0.0240 * \mathit{AirSpeedPara}(\text{mile}/hr)
$$

$$
\begin{aligned}
\mathit{AirSpeedPara}(\text{mile}/hr) &= 16.0, \text{ for } \mathit{AirParaBin} = 00\text{–}18\\
&= 19.5, \text{ for } \mathit{AirParaBin} = 18\text{–}21\\
&= 22.5, \text{ for } \mathit{AirParaBin} = 21\text{–}24\\
&= 25.0, \text{ for } \mathit{AirParaBin} = 24\text{–}28\\
&= 31.0, \text{ for } \mathit{AirParaBin} = 28\text{–}33\\
&= 33.5, \text{ for } \mathit{AirParaBin} = 33\text{–}38\\
&= 40.0, \text{ for } \mathit{AirParaBin} = 38\text{–}45\\
&= 49.0, \text{ for } \mathit{AirParaBin} = 45\text{–}52\\
&= 57.0, \text{ for } \mathit{AirParaBin} = 52\text{–}60\\
&= 67.0, \text{ for } \mathit{AirParaBin} = 60\text{–}99
\end{aligned}
$$

Although the scientific literature contains results of many computational fluid dynamics studies that detail how gases flow around moving bodies, the examples illustrate a more general description of the dependence of RSD signals from pollutants in the vortex on vehicle operation and pollutant release characteristics has been used. The weight functionality characterizes the shape of the vortex as viewed by the RSD when pollutants are released from a vehicle under a range of conditions that are expected from in-use vehicles.

In examples, the scansum, which is the sum of all pixels in each RSD's scan for each pollutant, is calculated. This embodiment quantifies emission rates using scansums. Certain examples may use pixel measurements without summing them. FIG. 9 shows scansum time traces for fifteen transits when artificial evaporative HC (butane) was released at 10,913 mg/mile from a test vehicle when it was driving under the RSD at 37.5 mile/hour. Each dot in FIG. 9 represents one scansum. The fifteen transits are made up of four replicate transits with releases from the fuel fill door (Door=solid lines-purple), under the hood (Hood=short dashed lines-green), on top of the fuel tank (Tank=mid-length dashed lines-orange), and inside the left-rear wheel well (Well=long dashed lines-red).

The traces in FIG. 9 have been aligned in time at the vehicle rear (Scan=0). The traces in the figure are generally made up of a peak at about Scan 2. After the peak, the traces decay in a variety of paths toward a scansum of zero. This diversity of scansum shapes is attributed to turbulence and instrumental noise. Because of this diversity and to get a clearer picture of the overall tendency of the scansum trace shape, the 207 traces for 10,913 mg/mile HC releases are averaged across all four test vehicles, all four test speeds, all four artificial evaporative HC release locations, and all replicates to produce a grand mean trace, which is shown by the black dots on a linear scale in FIG. 10 and a log scale in FIG. 11. These figures show that after After-Vehicle Scan 8 (0.4 s behind the vehicle rear), the RSD signal tends to decay exponentially.

To examine the influences on the grand scansum shape, the 207 scansum time traces are averaged in categories of vehicle identity, road speed, and HC release location. FIGS. 12-14 show the log of the average scansum time traces for the four different levels of each of those categories. Each curve is the average of approximately 50 traces. Just as seen in the grand average log plot in FIG. 11, the curves in FIGS. 12-14 are characterized by a peak at Scan=2 followed by an exponential decay after After-Vehicle Scan 8 (0.4 s behind the vehicle rear). The plots indicate that all levels of those categories have close to the same scansum time trace shape.

An analysis of a second measurement dataset used RSD-measured exhaust CO2 in the vortexes of over 30,000 in-use vehicles to refine the relationships that describe the scansum time trace shape and influence the measurement of emission rates. The statistical analysis of the 30,000 CO2 scansum time traces confirmed that the decay after Scan 8 was exponential and was independent of vehicle, AirSpeed Para, and Vehicle Length. However, the analysis revealed that AirSpeed Para and Vehicle Length may influence scansum time traces. FIGS. 15-16 illustrate exemplary average relative CO2 mass time traces in bins of AirSpeed Para plotted on linear and log scales. Each curve shows again that it is made up of a peak at Scan 2 followed by a decay that appears to be purely exponential after Scan 8. FIGS. 17-18 illustrate exemplary average relative CO2 mass time traces averaged by Vehicle Length bin. Again, each curve is made up of a peak at Scan 2 followed by a decay that appears to be purely exponential after Scan 8.

The exemplary illustrations depicted in FIGS. 15-18, which were generated from the larger, second measurement dataset, confirm that the shape of the vortex time trace is a function of time after the vehicle rear, vehicle air speed parallel component, and vehicle length. The analysis of this dataset's vortex time traces produced the weights shown in FIGS. 6-8 and the parametrization of the weights given by Equations 9-12.

Together, the first and second measurement dataset analyses showed that the shape of the vortex time traces are characterized by a peak at Scan 2, which is 0.1 seconds after the vehicle rear, followed by an exponential decay. The exponential decay rate is independent of vehicle, road speed, vehicle air speed parallel component, release location, vehicle length, and pollutant. The shape of the peak, which extends from the vehicle rear to Scan 8, which is 0.4 seconds after the vehicle rear, is additionally influenced by vehicle length and air speed parallel component.

The Emission Calculation Device (ECD) 18 is configured to use one or more of the outputs of either the PPD or SED to calculate the Release Rate and/or the Emission Rate of one or more emitted emission materials from the vehicle. The ECD 18 includes a processing unit configured to calculate the pollutant Release Rate and Emission Rate using the calculated quantities derived earlier from the RSD system measurements and estimates of vortex properties. The ECD processing unit is also configured to combine the measurements of each of the two or more emitted emission materials from the RSD sensor, with representative portions of the masses of at least one of the emitted emission materials having potentially different source locations on the object being determined. Inputs include the improved pollutant data arrays, RSD data location index for the vehicle rear, vortex weights, RSD instrument geometry and operating characteristics, Vortex Entrainment Time (VET), and vehicle road speed. Outputs from the ECD 18 include the time-based Release Rate (g/hr) and the distance-based Emission Rate (g/mile) for each transit and each pollutant measured by the RSD.

Figure 19:
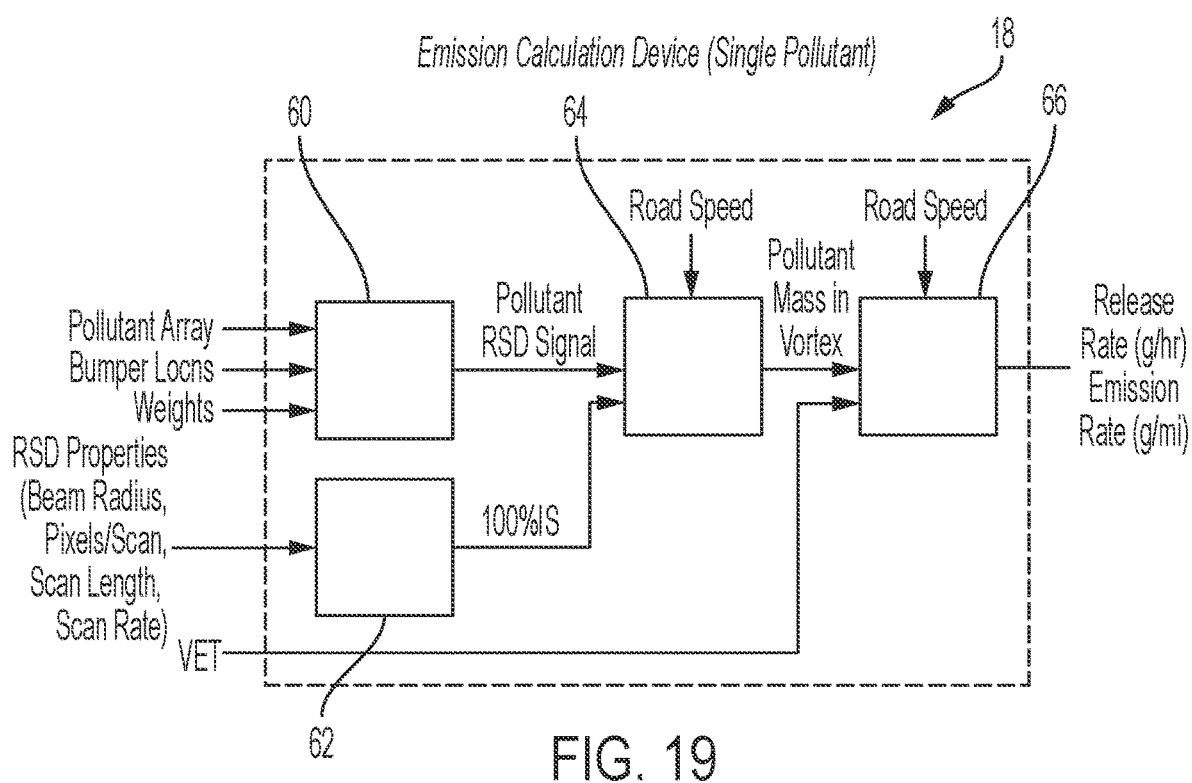
FIG. 19 is a diagram illustrating exemplary elements of an emission calculation device.

The ECD 18 is depicted by example in FIG. 19 with a plurality of elements including a Pollutant RSD Signal Device 60, a 100% Illumination Speed Device 62, a Mass-in-Vortex Calculation Device 64, and an Emission Rate Calculation Device 66.

The Pollutant RSD Signal Device 60 is configured to calculate the mass-equivalent of a pollutant signal obtained by an RSD instrument from the vortex behind a moving vehicle. Inputs to the device 60 include the pollutant Improved Data array from the Pre-Processing Device or the pollutant Emission Components array from the Separation/Estimation Device (if separation is performed), Weights from the Weights Calculation Device, Vehicle Rear Scan Number from the Vehicle Characteristics Device, and a Pollutant Conversion Factor that gives the conversion between the RSD optical measurement quantity and the pollutant mass. The term Pollutant Conversion Factor thus refers to a factor that is used to convert RSD optical values to mass, for example, molecular weight for gases, or extinction coefficient for particulate material. Output of the device 60 include Pollutant RSD Signal (g). Improved data may refer to raw data that has been improved through processing to reduce noise, artifacts, outliers, distortion, and baseline offsets.

The Pollutant RSD Signal Device 60 converts the optical mass measurement of each pixel in the pollutant array into a mass value:

Pollutant Mass in Pixel(g)=Pixel Optical Mass*Light Beam Area(m2)*Pollutant Conversion Factor (Eq. 13)

where
Pixel Optical Mass=RSD-measured pollutant optical mass in each pixel
Light Beam Area (m2)=Area of the RSD light beam
Pollutant Conversion Factor=Factor that converts the RSD-measured optical mass to pollutant mass In examples under discussion, gaseous pollutant Pixel Optical Mass is reported by the RSD 12 as mole/m2. For pure compound gases (e.g., CO, NO, CO2), the Pollutant Conversion Factor is the Pollutant Molecular Weight (g/mole), and Equation 13 becomes:

Pollutant Mass in Pixel(g)=Pixel Optical Mass(mole/m2)*Light Beam Area(m2)*Pollutant$MW$(g/mole) (Eq. 14)

For mixtures of gases (e.g., Exhaust HC, Evaporative HC)), the Pollutant Conversion Factor is the Pollutant Molecular Weight (g/mole) of the basis gas in which the emission rates are to be calculated, for example, propane. For particulate material (PM), a person skilled in the art may choose a Pollutant Conversion Factor that is appropriate for converting the RSD's measurement of PM into PM mass.

The Pollutant RSD Signal Device 60 is configured to convert the two-dimensional RSD data location indexes referenced by scan position m and scan number n to one-dimensional data location indexes referenced to the vehicle rear so that the pollutant data array can be spatially and temporally aligned with the Weights. In this example, the data location indexes are the scan identifier values v. This conversion may be performed in two sub-steps. In a first sub-step, the Pollutant Mass in each Scan Number may be computed by summing values of the two-dimensional interpolated RSD measurements in each instrument channel indexed by scan number n across the range of scan positions m as $$\text{Pullutant Mass in Each Scan }(n) = \sum_{m=1}^{M} x_{m,n}$$

In a second, sub-step, the Pollutant Mass in Each Scan may be shifted by the Scan Number of the Vehicle Rear using the conversion:

Scan Value v After Vehicle Rear=Scan Number n−Scan Number of Vehicle Rear

This results in the Pollutant Mass in Vortex values indexed by the Scan Value v. Typical ranges of the value v include v=0 to v=20.

The Pollutant RSD Signal Device 60 is configured to combine the array of Pollutant Mass in the Vortex values with the Weights to produce the Pollutant RSD Signal. This can be considered as a fitting of the Weights to the array of Pollutant Mass in the Vortex values, followed by taking the area under the fit to the Pollutant Mass data array. W(v) corresponds to the Weights indexed by scan value v produced by the Vortex Shape Calculation Device (VSCD) 16, denoted as W(v), v={1,2, . . . ,20}. The Pollutant RSD Signal is computed as $$\text{Pollutant } RSD \text{ Signal} = \frac{\sum_{v=0}^{20} W(v) \cdot \text{Pollutant Mass in the Vortex }(v)}{\sum_{v=0}^{20} W(v)}$$

The 100% Illumination Speed Device 62 is configured to calculate the RSD 100% Illumination Speed (100% IS), which is the road speed at which the vehicle/vortex would have to move to produce an RSD signal that corresponds to the RSD signal produced if the RSD light beam illuminated the scan path once and only once. The 100% Illumination Speed (100% IS) may refer to a geometric characteristic of an RSD instrument, and is independent of other variables including vehicle, road speed, pollutant, release rate, release location, and wind. Inputs to the 100% Illumination Speed Device 62 include the geometrical and operating properties of the RSD 12. In examples, the inputs include the RSD laser beam radius, laser beam scan rate, scan path length, and number of pixels per scan. The device 62 output includes the 100% Illumination Speed:

$$100\% \ IS(m/s) = \frac{\text{Number of Pixels/Scan} * \text{Effective Pixel Area } (m2/\text{pixel}) * \text{Scan Rate (scan/s)}}{\text{Scan Length } (m)} \quad (\text{Eq. 15})$$

The 100% IS for other exemplary RSD 12 set-ups would be calculated similarly as a person of ordinary skill would readily understand.

As shown in FIG. 4, in the reference frame of the vortex, the laser beam optically samples the vortex with a zigzag pattern from above the roadway. Of course, the instrument can make measurements only where pixels (e.g., scanning dots 50) are illuminated. The pollutant mass in the white areas between the scans and around the scanning dots 50 is not illuminated and therefore does not contribute to the RSD signal. The pitch of the zigzag in the vehicle/vortex reference frame is a function of the road speed. At higher speeds, the pitch is larger. After pre-processing, the arrangement of the processed measurements is on a rectangular grid, but the shape and size of the measurement region remains the same. Because the diameter of the laser beam is independent of road speed, but the distance in the vortex between successive scans depends on road speed, the fraction of the vortex that is illuminated by the light beam depends on road speed.

In addition, an overlap of pixels is a function of vortex speed. At road speeds below 100% IS, all pixels have some degree of overlap with other pixels. To calculate 100% IS, the speed at which the total area illuminated by the RSD would be equal to the total area of the scan path is determined. The scan path is the path that the RSD instrument is scanning. The fraction of vortex illuminated is a function of the road speed and characteristics of the RSD instrument. When the RSD instrument scans the roadway from above:

$$\text{Fraction of Vortex Illuminated} = \frac{\text{Area of Illumination for 1 second}}{\text{Area of Scan Path for 1 second}} \quad (\text{Eq. 16})$$

The Area of Illumination for 1 second is the sum of the areas illuminated by each pixel for all pixels illuminated in 1 second. The areas of all pixels are to be summed even if pixels overlap. This is appropriate since while overlapping pixels cause over-sampling of the pollutants in the vortex, overlapping pixels do contribute to the RSD signal.

An example serves to illustrate Equation 16. Suppose the vortex, which moves at the same speed as the vehicle, is moving at 25 m/s. The scan length is 3.66 m (=12 feet), which is the length of the retro-reflective tape on the pavement. Thus, the Area of the Scan Path for 1 second is 91.5 m2 (=25 m*3.66 m). Since the exemplary RSD laser beam has a radius of 1.0 cm, scans the retro-reflective tape 20 times per second, and each scan has 256 pixels, the Area of Illumination for 1 second is about 1.61 $m^2$ (=$\pi$*(0.01 m)$^2$*20*256). Thus, the Fraction of Vortex Illuminated is about 1.75% (=1.61/91.5).

In examples, the Fraction of Vortex Illuminated (FVI) is given by:

$$FVI = \frac{\text{Number of Pixels/Scan} * \text{Effective Pixel Area } (m2/\text{pixel}) * \text{Scan Rate (scan/s)}}{\text{Road Speed } (m/s) * \text{Scan Length } (m)} \quad (\text{Eq. 17})$$

This means that the mass of pollutant in the vortex moving at 25 m/s past the instrument is about 57 times larger (=1/0.0175) than the mass illuminated by the RSD laser beam.

Note that Equation 17 is specific to the RSD 12, which scans the full width of the vortex from above the pavement and which is accordingly believed to obtain a representative optical sample of the vortex. The term "representative" as used herein may refer to a quality or quantity of an illuminated or otherwise measured sample of the vortex with respect to the entire vortex. For other types of RSD instruments that are believed to obtain a representative optical sample, Equation 17 may be modified via a different appropriate relationship as understood by a skilled artisan.

To derive an expression for the 100% IS of this example, Equation 17 is simply solved for Road Speed for a value of Fraction of Vortex Illuminated=1, which produces Equation 15. For the RSD 12 used in this example, the 100% IS would be calculated as:

$$100\% \ IS = \frac{256 \text{ pixels/scan} * \pi * (0.01m)^2/\text{pixel} * 20 \text{ scan/s}}{3.66m} = 0.44m/s = (0.97mph)$$

The Mass-in-Vortex Calculation Device 64 is designed to calculate the pollutant mass in the vortex from the pollutant mass that was illuminated and measured by the RSD 12. The Mass in Vortex is given by:

$$\text{Mass in Vortex (g)} = \frac{RSD \text{ Signal (g)} * \text{Road Speed } (\text{mile}/hr)}{100\% \text{ Illumination Speed } (\text{mile}/hr)} \quad (\text{Eq. 18})$$

where

Mass in Vortex (g)=Mass of the pollutant in the entire vortex

RSD Signal (g)=Pollutant RSD signal output by the Pollutant RSD Signal Device

Road Speed (mile/hr)=Vehicle road speed measured by the RSD system

100% IS (mile/hr)=100% illumination speed from the 100% IS Device 62

In certain examples, RSD 12 does not illuminate the entire vortex 38. In these examples, the RSD 12 illuminates a sample of the vortex. Thus, RSD signals are proportional only to the fraction of the vortex that they illuminate. The fraction of the vortex that the RSD 12 illuminates is related to the geometry of the RSD's light beam and its illumination of the vortex. As the vehicle 36 and associated vortex 38 move faster, the distance between consecutive scans in the vortex gets larger, and therefore the fraction of the vortex that is illuminated decreases. Consequently, as road speed increases, the RSD signal tends to decrease. The RSD Signal (g) is referred to as the sum of pollutant masses measured by the RSD 12 in all RSD scans of the vortex 38 or in all RSD pixels 50 of the vortex. Therefore, to determine the mass in the entire vortex, the RSD signal must be corrected for the road speed.

The Emission Rate Calculation Device 66 is configured to calculate emission rates from the calculated pollutant mass in the vortex using the calculated value of the Vortex Entrainment Time (VET) and the measured vehicle road speed. The device 66 calculates a time-based Release Rate (g/hr) and a distance-based Emission Rate (g/mile).

$$\text{Release Rate}(g/hr) = \frac{\text{Mass in Vortex}(g)}{VET(hr)} \qquad \text{(Eq. 19)}$$

Then, the Emission Rate from Equation 19 divided by the Road Speed gives the Emission Rate:

$$\text{Emission Rate}(g/\text{mile}) = \frac{\text{Release Rate}(g/hr)}{\text{Road Speed}(\text{mile}/hr)} \qquad \text{(Eq. 20)}$$

where

Mass in Vortex (g)=Pollutant mass in vortex calculated from the Mass-in-Vortex Calculation Device 64

VET (hr)=Vortex Entrainment Time calculated from the Vortex Entrainment Time Calculation Device 54

Road Speed (mile/hr)=Vehicle road speed as measured by the RSD 12

A portion of the emissions released from a vehicle is temporarily stored or entrained in the swirling vortex that follows a moving vehicle, as discussed above and illustrated by example in FIG. 4. This entrainment process is a dynamic equilibrium consisting of the emissions released from the vehicle, flow of a portion of the emissions into the vortex behind the vehicle, and the stripping of emissions from the vortex by the air passing over the vortex as the vortex moves down the road. This process is shown by example in FIG. 4. For a vehicle operating under steady-state conditions, which can be defined as constant road speed, constant wind speed and direction, and constant emissions release rate, the mass of a given pollutant in the vortex will oscillate around an average value.

Figure 24:
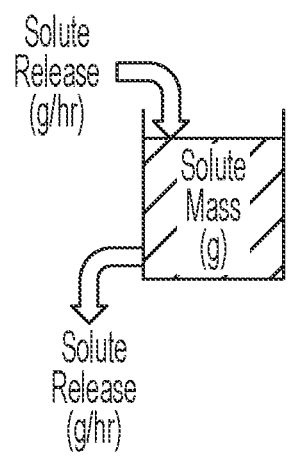
FIG. 24 illustrates a front view of an exemplary stirred tank analogy to the exemplary body shown in FIG. 4.

This steady-state entrainment process is similar to the continuously stirred tank model in chemical engineering as illustrated by example in FIG. 24. For the stirred tank model, a stream of liquid, which contains a solute, flows into the tank, and an equivalent flow exits the bottom of the tank. Under steady-state conditions, the mass of solute in the tank is proportional to the solute release rate with a proportionality constant called the turnover time:

$$\text{Mass in Tank}(g) = \text{Turnover Time}(hr) * \text{Release Rate}(g/hr) \qquad \text{(Eq. 21)}$$

Under steady-state conditions, if the solute release rate is low, the mass in the tank will be low. If the release rate is high, then the mass in the tank will be high. The turnover time is characteristic of the inlet flow rate, the volume of the tank, and the mixing in the tank. Following the stirred tank model, Equation 21 may be expressed in terms of entrainment of released emissions into the vehicle's vortex:

$$\text{Mass in Vortex}(g) = VET(hr) * \text{Release Rate}(g/hr) \qquad \text{(Eq. 22)}$$

where the Mass in Tank becomes the Mass in Vortex, and the Turnover Time proportionality constant becomes the Vortex Entrainment Time (VET). From Equation 22, a large VET value means that the ratio of Mass in Vortex to Release Rate is large. There are contributions to the size of VET, including the efficiency of entrainment of emissions released from the vehicle, the volume of the vortex, and mixing in the vortex.

When most of the released emissions bypasses the vortex and only a small fraction becomes entrained, the VET is small. This is more likely to happen for emissions released farther up front on the vehicle and especially when there is strong sideways air movement caused by wind. Vehicles that have large drag areas tend to have large vortexes. Large vortexes can store more pollutant mass for the same release rate than a small vortex can. Thus, large vortexes tend to produce larger RSD signals and tend to have larger VETs. A rearrangement of Equation 22 provides Equation 19, which expresses the pollutant Release Rate based on an RSD measurement of Mass in Vortex and the VET.

As discussed above, the Vortex Entrainment Time Calculation Device 54 (FIG. 5) is configured to calculate the Vortex Entrainment Time (VET) for each vehicle RSD transit. The VET is discussed in detail, at least because Equation 19 calculates the Release Rate (g/hr) from the RSD-measured Mass in Vortex and the VET. Inputs to the Vortex Entrainment Time Calculation Device 54 include the AirSpeed Para from the AirSpeed Calculation Device 52, and Vehicle Drag Area from the Vehicle Characteristics Device 56. The VET Calculation Device 54 outputs a value of VET for the vehicle transit.

For light-duty vehicles with drag areas near 10 ft$^2$ driving with AirSpeed Para at around 30 mph, VET for this example is typically about 4 seconds. If no additional information or measurements are available, 4 seconds can be used for VET for light-duty vehicles in this example as a first approximation, regardless of air speed conditions. To improve on this estimate of VET, regression analysis shows that more accurate VET values can be determined by considering descriptors of vehicle, vehicle operation, and environmental conditions:

$$VET(s) = \frac{B * \text{Release Location Factor} * \text{DragArea}(ft^2)^{\wedge}(1/3)}{\text{AirSpeed Para}(\text{mile}/hr)^{\wedge}(1/2)} \qquad \text{(Eq. 23)}$$

where

B=10.4, for this embodiment

Release Location Factor=1.00, if release location is known to be the tailpipe

=0.67, if the release location is unknown

DragArea (ft2)=Vehicle drag area from the Vehicle Characteristics Device

AirSpeed Para (mile/hr)=Parallel component of the AirSpeed from the Air Speed Calculation Device 52

Release Location Factor refers to a factor that reflects the Vortex Entrainment Time of an emission release location relative to the Vortex Entrainment Time of a release from the tailpipe. For releases from the vehicle rear, such as from the tailpipe or a fuel fill door located on the rear of a quarter panel, the Release Location Factor will be near 1. If the emissions release location is known to be the tailpipe, as would be the case for Exhaust CO2, Exhaust NO, Exhaust CO, and Exhaust HC, then the Release Location Factor of 1.00 should be used in Equation 23. A Release Location Factor of 0.67 can be used if the actual release location of Evaporative HC is unknown. The Release Location Factor will be closer to 0 for release locations more forward on the vehicle. For example, analysis has shown that releases from under the hood have Release Location Factors around 0.36.

The B coefficient value in Equation 23 may be specific to the examples and for the RSD 12. The B coefficient may be different for other RSDs due to their optical efficiencies, for example, retro-reflector efficiency, and their optical strategies for illuminating the vortex. The value of B for specific examples and RSDs may be determined as described below:

Select a test vehicle of known Drag Area. Instrument the test vehicle to determine its tailpipe exhaust CO2 Release Rate (g/hr) by either querying its CAN bus data stream or its driver instrument display for fuel economy, or by directly measuring the tailpipe CO2 release rate with an external measurement device, such as a Portable Emissions Measurement System (PEMS) or miniPEMS, as may be done by one skilled in the art.

Drive the test vehicle past the RSD while collecting RSD detailed CO2 data of the vortex and data to determine the AirSpeed Para for the transit.

Calculate the CO2 Mass in Vortex (g) using the collected RSD detailed CO2 data.

Calculate the VET (hr) using Equation 22 with the measured CO2 Mass in Vortex (g) and the measured CO2 Release Rate (g/hr).

Calculate the value of B using Equation 23 with the calculated VET, known Drag Area, determined AirSpeed Para, and a Release Location Factor of 1.00, which is the defined value for tailpipe releases.

Characteristic VET values depend on the size and shape of the vehicle, the location of the release from the vehicle, and the speed and direction of air moving across the vehicle (i.e., the vehicle's air velocity). VET values do not depend on the release rate. Thus, methods to compute the VET value can use the physical outline of the vehicle in the measurement data, the spatial locations of large-amplitude plume components in the processed measurements, and the wind velocity as measured by the RSD during the transit event.

The VET may be influenced by the volume of the vortex, and the efficiency of entrainment of emissions released from the vehicle into the vortex. Consider a large vehicle and a small vehicle that have the same pollutant release rates. The larger vehicle will have a larger vortex, which will contain a larger pollutant mass and produce a larger RSD signal, than the smaller vehicle will. Accordingly, the larger vehicle will have a larger VET. Now, consider two vehicles of the same size and shape having the same pollutant release rate, but one vehicle has the release at the vehicle rear and the other vehicle has the release under the hood. The vehicle with the under-the-hood release will likely have a smaller VET since a smaller portion of its release is likely to become entrained in the vortex compared to the vehicle with the rear release—especially if the vehicles are in a strong cross wind where AirSpeed Perp is large.

For an exemplary dataset, artificial evaporative HC was metered at different Release Rates from four light-duty test vehicles with different drag areas while driving them under an RSD instrument. The RSD data was used to calculate the Mass in Vortex. Then, the VET for each transit was calculated using a re-arrangement of Equation 22:

$$VET(hr) = \frac{\text{Mass in Vortex}(g)}{\text{Release Rate}(g/hr)} \quad \text{(Eq. 24)}$$

Table 2 below shows exemplary results of 50 transits made on each of the four test vehicles releasing a metered, constant evaporative HC Emission Rate. The results show that vehicles with larger drag areas had higher VETs than those with lower drag areas. The results also show that for these four light-duty vehicles, drag area had a mild effect on VET. Specifically, the ratio of largest to smallest drag area was about 2:1, but the ratios of VETs was only about 1.3:1. Thus, the inventors found that in certain examples VET may be proportional to approximately the one-third root of the drag area.

TABLE 2

Relative VET by Vehicle Drag Area

| Test Vehicle ID | Drag Area (ft2) | Relative VET |
|---|---|---|
| 1 | 7.2 | 0.85 |
| 3 | 10.7 | 1.10 |
| 4 | 6.7 | 0.95 |
| 5 | 13.4 | 1.06 |

In a second exemplary dataset, artificial exhaust and evaporative HC emissions were metered in releases from test vehicles. The RSD data was used to calculate the Mass in Vortex. Then, the VET for each transit was calculated using Equation 24 just as for the first dataset.

Figure 20:
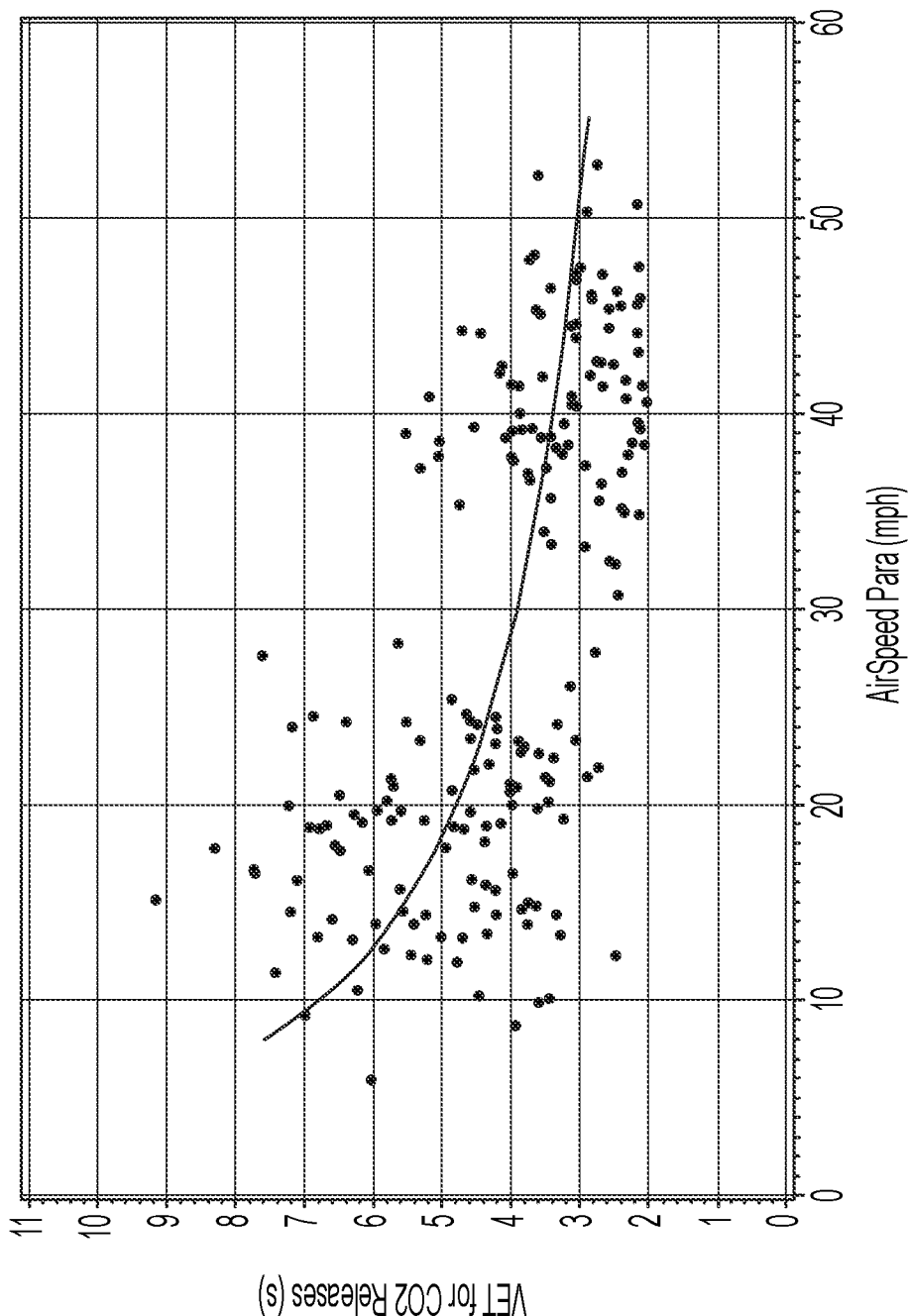
FIG. 20 is a graph illustrating Vortex Entrainment Time values plotted against the AirSpeed Para in accordance with examples.

For the replicate transits of the Test Vehicle 1, which was an all-electric vehicle with a drag area of 8.0 ft$^2$, artificial exhaust gas containing CO2 was metered from a fake tailpipe. The calculated VET values are plotted against the AirSpeed Para in FIG. 20. The solid trend curve through the data points was used to determine the B-coefficient value of 10.4 in Equation 23 while the Release Location Factor was defined as 1.00.

Figure 21:
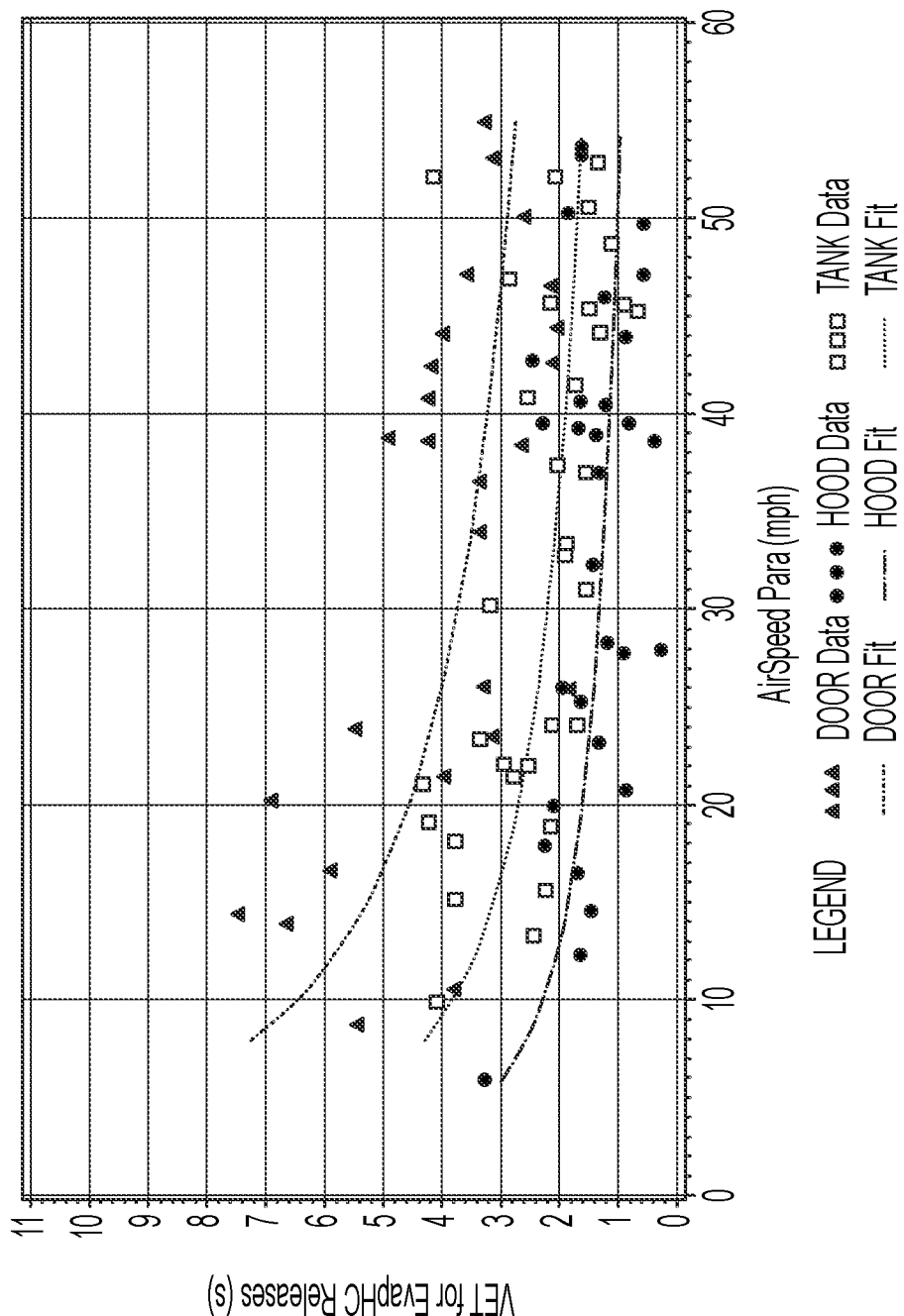
FIG. 21 is a graph illustrating calculated Vortex Entrainment Times for an exemplary test vehicle as a function of evaporative HC release location and AirSpeed Para.
Figure 22:
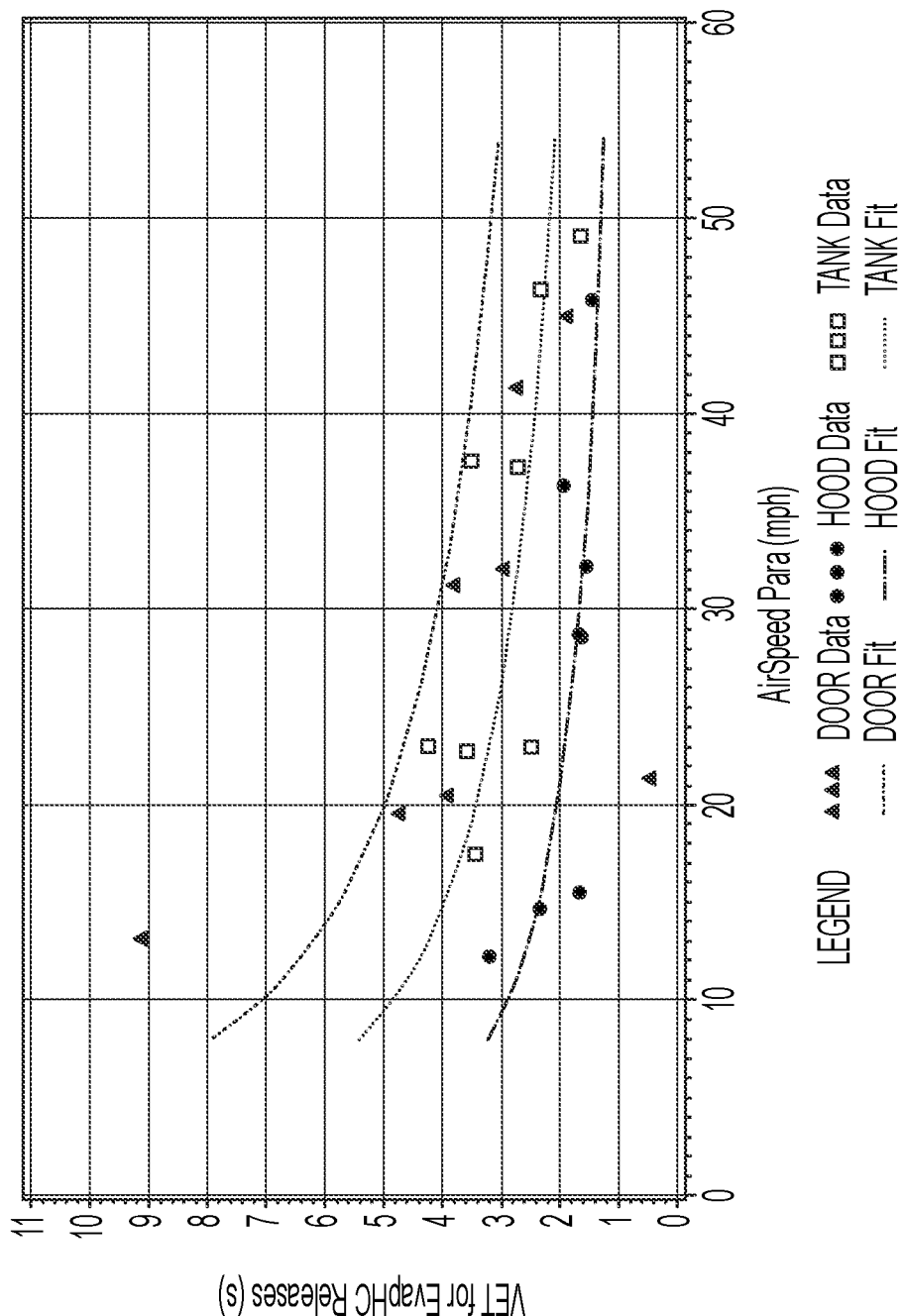
FIG. 22 is a graph illustrating calculated Vortex Entrainment Times for another exemplary test vehicle as a function of evaporative HC release location and AirSpeed Para.

Artificial evaporative HC was metered at different Release Rates from three different locations on light-duty test vehicles while driving them at two different speeds under an RSD instrument. FIGS. 21 and 22 show the calculated VET for two test vehicles (drag areas=8.0 and 10.2 ft2, respectively) as a function of evaporative HC release location and AirSpeed Para. The three release locations were at the fuel fill door (Door=solid line or purple) at the rear of the quarter panel, on top of the under-vehicle fuel tank (Tank=short dash line or orange), and on top of the engine under the hood (Hood=long dash line or green).

Statistical analysis of the data from both vehicles indicated that the trends of VET, which are shown as the curved lines in FIGS. 21 and 22, could be modeled using Equation 23 to produce the Release Location Factor values in the last column of Table 3 below. The table shows that the Release Location Factors decrease as the location moves from the rear to the front of the vehicle and that the factors between the two vehicles are similar for similar locations. The average of 0.67 for the six Release Location Factors is used in Equation 23 in the absence of release location information. FIGS. 21 and 22 show substantial scatter in the VET values. Because the flow of air around the vehicle is complex and varies with time, the value of VET can vary with time to produce the observed scatter. However, on the average over a period of time, VET values for a given operating condition converge to a finite, repeatable value.

TABLE 3

Release Location Factors for Two Test Vehicles

| Test Vehicle | Release Location | Drag Area (ft2) | Release Location Factor |
|---|---|---|---|
| 1 | Tailpipe CO2 | 8.0 | ≡1.00 |
| 1 | Door | 8.0 | 1.00 |
| 1 | Tank | 8.0 | 0.59 |
| 1 | Hood | 8.0 | 0.36 |
| 3A | Door | 10.2 | 1.00 |
| 3A | Tank | 10.2 | 0.67 |
| 3A | Hood | 10.2 | 0.41 |

Figure 23:
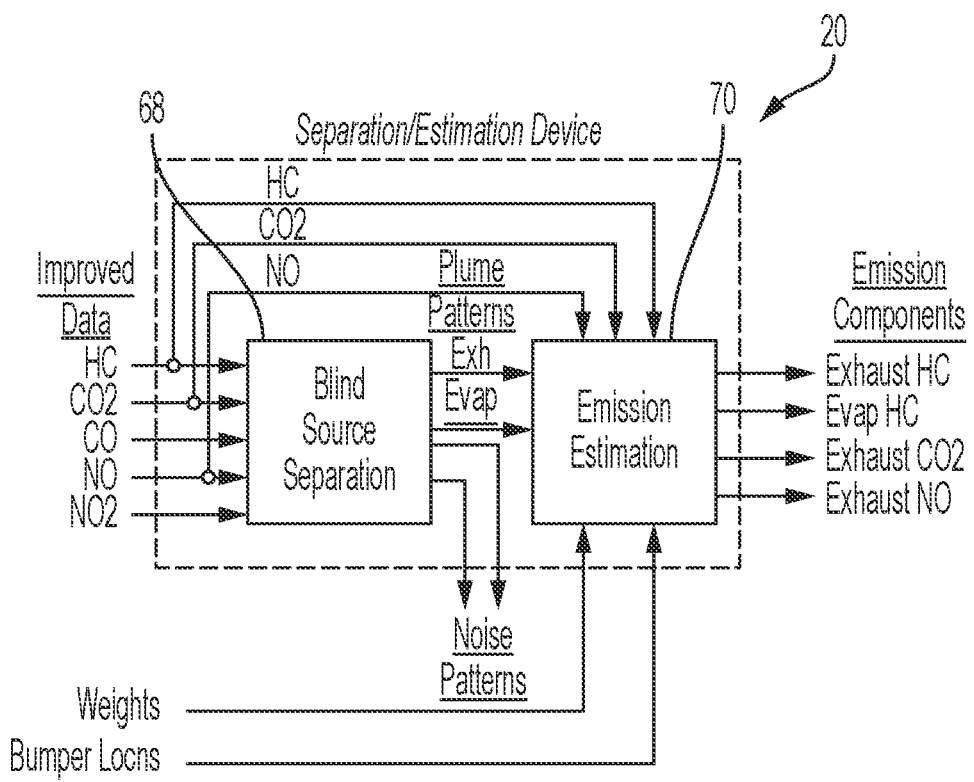
FIG. 23 is a diagram illustrating exemplary elements of a Separation/Estimation Device.

The SED 20 extracts components of the measured emission materials signals to associate them with one or more different plume types. This allows the estimation of emission rates of specific emission materials that are associated with specific spatial locations around the vehicle. A flow diagram of the Separation/Estimation Device (SED) 20 (FIG. 2) is depicted in FIG. 23. In examples the SED 20 includes a blind source separation module 68 and an emission estimation module 70.

In the blind source separation module 68 of the Separation/Estimation Device 20, the measured data is assumed to be of the form of the linear model in Equation 1. Blind source separation algorithms are applied to the output of the Pre-Processing Device 14 in FIG. 2. The resulting outputs are in the form of spatial patterns corresponding to plumes emitted from the vehicle 36 at different spatial locations around the vehicle. If the number of plumes identified is fewer than the number of signal channels, the additional outputs produced from this stage are labelled as noise components.

In emission estimation module 70, signals identified as plumes are combined with the outputs of a Noise Reduction and Signal Correction block to estimate the emission type contained in one or more identified plume patterns. For example, the plume associated with tailpipe emissions can be combined with the improved NO channel data to determine the amount of NO gas emitted from the exhaust location. As another example, the plume associated with evaporative emissions at the fuel fill door location of the vehicle can be combined with the improved HC channel data to determine the amount of HC gas emitted from the evaporative fuel fill door location. Other combinations are possible and not limited by the overall processing methodology described. Two exemplary methods for extracting these components are described in a section below. The result of this calculation is a set of images that correspond to selected gas types as emitted from specific locations around the vehicle.

The overall goals and processing methodology for the Separation/Estimation Device 20 is described in even greater detail below. The approach leverages known results and algorithms in the signal processing literature with unique design modifications and tuning for the examples. Although specific choices have been made to illustrate specific examples, a skilled artisan would understand if and how appropriate modifications and adjustments to the preferred embodiment could be made.

Given the measurement model, the SED 20 is configured to estimate the portion of a particular gas being released from a particular location on the vehicle that is present in a particular pixel measurement. This calculation is expected to be performed on a portion of an extracted image generated from this linear model. To better understand this task, let the first measurement at one pixel position for a given time instant be modeled as $$x_1(t) = x_{11}(t) + x_{12}(t) + x_{13}(t) \qquad (Eq. 25)$$

where $x_{11}(t)$, $x_{12}(t)$, and $x_{13}(t)$ denote the hydrocarbon emissions emitting from three different emission locations #1, #2, and #3, respectively, where any noise $n_1(t)$ contained in the first measurement has been neglected. These locations may correspond to known point emission locations, such as a tailpipe or fuel door, or to patterns generated from specific point locations, such as a leakage point under the vehicle hood. For the model in Equation 25, these emissions are represented by $$x_{11}(t) = a_{11}s_1(t), x_{12}(t) = a_{12}s_2(t), \text{ and } x_{13}(t) = a_{13}s_3(t),$$

respectively. In this example, each $s^1(t)$ represents the spatial signature of gases emitted from the ith location on the vehicle as observed in the pixel $x_1(t)$ being analyzed. Thus, the goal is to process the measurements in x(t) such that estimates of each $x_{11}(t)$, $x_{12}(t)$, and $x_{13}(t)$ are generated. This approach can be broken down into two tasks. First, process the measurements such that the spatial signatures $s_i(t)$, i={1,2,3} are reliably extracted. Second, use the ith spatial signature and the original measurements to estimate a specific component, such as $x_{1i}(t)$ for a particular choice of i. From the resulting images, an estimate of the total emissions coming from the particular spatial location can be formed.

Referring to the Blind Source Separation module 68, assuming that the levels of additive noise and artifacts are small, a linear model can be used to extract candidate spatial signatures from three appropriately chosen channels of the five-channel measurement data as $$\hat{s}(t) = Bx(t)$$

where $$\hat{s}(t) = [\hat{s}_1(t)\hat{s}_2(t)\hat{s}_3(t)]^T$$

contains the estimated spatial signatures in a desired order, and $$B = \begin{bmatrix} b_{11} & b_{12} & b_{13} & b_{14} & b_{15} \\ b_{21} & b_{22} & b_{23} & b_{24} & b_{25} \\ b_{31} & b_{32} & b_{33} & b_{34} & b_{35} \end{bmatrix}$$

is a matrix of separation coefficients. If there is no noise or artifacts, then, the optimal solution for the separation matrix satisfies $$BA = I$$

where A is as defined in Equation 1 and I is an identity matrix with ones along its diagonal and zeros everywhere else.

In practice, the number of spatial signatures may not be known. In addition, some residual noise may be present in the improved RSD signals. Thus, it is desirable to use an approach that can both isolate remaining noise components and identify candidate spatial signatures that can be analyzed to determine which of the signatures corresponds to significant parts of the improved RSD data for specific emission materials.

Given the measurement model, blind source separation is an approach for processing the measurements to produce candidate spatial signature signals, as understood by a skilled artisan. The FastICA algorithm [HyvarinenOja2000] can be employed for this task. The FastICA algorithm describes an iterative approach for adjusting the rows of a square matrix W according to the following criterion, $$\text{minimize/maximize} \quad \sum_{i=1}^{5} E\{C(y_i(t))\}$$

$$\text{such that} \quad W\overline{R}W^T = \sum$$

$$\text{where} \quad \overline{R} = E\{x(t)x^T(t)\}$$

$C(y_i(t))$ is a contrast function, the matrix $\Sigma$ is the identity matrix for the FastICA algorithm, $E\{M(t)\}$ denotes the sample average of a matrix sequence $M(t)$, and the candidate sources in the vector $y(t)$ are computed as $$y(t)=Wx(t)$$

This algorithm is appropriate for situations where the candidate plume spatial signatures do not have significant spatial overlap, such that the constraint $\Sigma=I$ is appropriate. For some situations, it is useful to model the overlap of the candidate plume signatures by allowing a non-diagonal constraint matrix $\Sigma$ that models this overlap. An example of a non-diagonal constraint matrix that is appropriate for the separation task in the invention is $$\sum = \begin{bmatrix} 1 & \rho & 0 & 0 & 0 \\ \rho & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

where a positive value of $\rho$ models the normalized cross-correlation between the exhaust and evaporative spatial plume signatures. A typical value for $\rho$ is $\rho=0.15$, although $\rho$ values in the range $0 \le \rho \le 0.4$ are useful.

An iterative approach for adjusting W to solve the separation task in this invention is as follows,

---

1. Choose $f_i(y_i) = \partial C(y_i)/\partial y_i$ or another appropriate function, e.g. $f_i(y_i) = y_i^3$.
2. Do for each $i = \{1, 2, \ldots, 5\}$, where $W = [w_1 \; w_2 \; w_3 \; w_4 \; w_5]^T$ and $\sigma_{ii}^2$ is the ith diagonal element of $\Sigma$:
   $\overline{R} = E\{x(t)x^T(t)\}$
   $\tilde{w}_i = \overline{R}^{-1} E\{xf_i(y_i)\} - E\{f_i'(y_i)\}w_i$ $\overline{w}_i = \sqrt{\dfrac{\sigma_{ii}^2}{\tilde{w}_i^T \overline{R} \tilde{w}_i}} \, \tilde{w}_i$ 3. Do for $k = 1$ to 10 or until convergence, where $\overline{W} = [\overline{w}_1 \; \overline{w}_2 \; \overline{w}_3 \; \overline{w}_4 \; \overline{w}_5]^T$:

$\overline{W}_{new} = \overline{W} + \dfrac{1}{2} \left( \sum - \overline{W}\overline{R}\overline{W}^T \right) \overline{W}$ 4. Set $W_{new} = P(y)\overline{W}_{new}$ and $\hat{s}(t) = P(y)y(t)$ and repeat the above steps until convergence

---

After separation, the candidate signatures in the vector $y(t)$ need to be checked to see how well they represent the improved RSD signals of one or more of the HC, CO2, CO, NO, and/or NO2 measurements. Knowledge of the typical plumes that can be emitted from vehicles on the road is used here. For example, since CO2 concentrations above the ambient level are largely indicative of exhaust emissions, the normalized correlations between the CO2 channel $x_2(t)$ and the five candidate plume signatures in $y(t)$ can be computed. Let $\rho_{CO2,i}$ denote these normalized correlation values. The one with the largest absolute value of normalized correlation with index j corresponds to the exhaust plume, and its sign can be used to adjust the amplitude of the candidate exhaust plume as $$\hat{s}_1(t) = \text{sgn}(\rho_{CO2,j})y_j(t),$$

where the sign-function $\text{sgn}(\rho)$ is 1 if $\rho$ is positive-valued, 0 if $\rho$ is zero-valued, and $-1$ if $\rho$ is negative-valued.

In accordance with examples, evaporative emissions, where they exist, are typically observed in the HC measurements. The normalized correlations between the improved HC signal $x_1(t)$ and the four remaining candidate plume signatures in $y(t)$ can be computed as $\rho_{HC,i}$. The one with the largest absolute value of normalized correlation with index k corresponds to the evaporative plume, and its sign can be used to adjust the amplitude of the candidate evaporative plume as $$\hat{s}_2(t) = \text{sgn}(\rho_{HC,k})y_k(t).$$

In this way, candidate plume signatures can be identified with the appropriate sign according to the number of possible plumes that are observed in the improved RSD data, up to the number of RSD data channels available. If the number of possible plumes is less than the number of RSD data channels, then the identity assignment $$\hat{s}_i(t) = y_i(t)$$

is made for the remaining data channels, as these remaining signals are noise spatial signatures.

These assignments of $y_i(t)$ to $s\_\{hat\}_i(t)$ are also used to define the permutation matrix $P(y)$ in the algorithm. For example, if $j=2$ and $k=1$, then $$P(y) = \begin{bmatrix} 0 & \text{sgn}(\rho_{CO2,j}) & 0 & 0 & 0 \\ \text{sgn}(\rho_{HC,k}) & 0 & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

Other methods to perform this assignment and sign recovery as understood by a skilled artisan could be used as well.

Regarding the Emission Estimation module 70, which is configured to perform estimations of the portions of these spatial signatures in the original measurement data. Note that each improved RSD signal sample $x\_i(t)$ has units of mass, whereas each plume signature $s\_\{hat\}_j(t)$ are effectively unitless because of normalization during separation process. Thus, a feature of the estimation is to "recover" the mass units of each plume type for each emission material in an accurate way. These estimates may be determined using a linear model. For example, for the first measurement signal $x_1(t)$, the estimates are $$\hat{x}_1(t) = h_1^T \hat{s}(t)$$
$$= h_{11}\hat{s}_1(t) + h_{12}\hat{s}_2(t) + h_{13}\hat{s}_3(t)$$
$$= \hat{x}_{11}(t) + \hat{x}_{12}(t) + \hat{x}_{13}(t)$$

where the "hatted" quantities are estimates of their true values within the signal model. Thus, the estimate of hydrocarbons emitted from Location #2 on the vehicle 36 is denoted as $$\hat{x}_{12}(t) = h_{12} \hat{s}_2(t).$$

These estimates are generally computed from the available signals using least-squares techniques. It is understood that one of several least-squares estimation approaches could be used, including weighted least-squares and constrained weighted least-squares, amongst other approaches. These estimation tasks are formulated as a minimization of a cost function J(h) that depends on the measured and computed signals in a particular way, some with additional constraints on the parameters in h. As illustrative examples, two such approaches are discussed below.

Consider the weighted least-squares (LS) cost function $$\mathcal{J}_{LS}(h_i) = \frac{1}{L} \sum_{t=1}^{L} w_t (x_i(t) - \hat{x}_i(t))^2$$

where L is the number of improved RSD signal samples corresponding to the HC RSD measurements and $w_t$ is a weighting function across the L measurements for the improved RSD signal images. In this context, t is the signal sample number, and each t can be mapped to a particular (x,y) position in each plume image. Note that the exact mapping from t to (x,y) determines the form of the weighting function for the estimation task. This weighting function can be computed from the Weights W(v) output from the Vortex Shape Calculation Device by extending the Weights across the improved RSD signal sample dimension t according to the converse of the Weights computation. For example, if the Weight values are one-dimensional and assigned by scan number, they can be extended to a two-dimensional weighting function by replicating these Weight values across the width of the two-dimensional improved RSD signal sample data sets, after which they can be assigned a one-dimensional index t associated with the improved RSD signal samples. Other extensions of the Weights to a spatial arrangement associated with the RSD measurement device are possible depending on the operation of the RSD 12, as readily understood by a skilled artisan.

The weighted least-squares cost function is minimized according to standard least-squares methods. The resulting weighted least squares (LS) solution can be described as $$h_{LS,i} = R^{-1} p_i$$

where $$R = \sum_{t=1}^{L} w_t \hat{s}_t \hat{s}_t^T$$

$$p_i = \sum_{t=1}^{L} w_t x_i(t) \hat{s}_t$$

are the weighted autocorrelation matrix and weighted cross-correlation matrix for the improved RSD signal $x_i(t)$ being modeled. From these calculations, the inventors may identify the estimated plume emission for the chosen emission materials to be analyzed from the weights and signals that have been computed. For example, the evaporative HC plume samples may be identified according to the description provided as $$\hat{x}_{11}(t) = h_{11} \hat{s}_1(t).$$

Other estimated plume emissions for different emission materials can be computed similarly as understood by a skilled artisan.

Other least-squares methods can be employed for the Emission Estimation Stage as well. Suppose instead the following constraints are desired to be imposed for each i $$\frac{1}{L} \sum_{t=1}^{L} \sum_{n=1}^{3} h_{in} \hat{s}_{nk}(t) = h_i^T s_x = s_{d,i}$$

where the quantities $s_x$, $s_{x,n}$, and $s_{d,i}$ all contain sample average values:

$$s_x = [s_{x,1} \ s_{x,2} \ s_{x,3}]^T$$

$$s_{x,i} = \frac{1}{L} \sum_{t=1}^{L} \hat{s}_i(t)$$

$$s_{d,i} = \frac{1}{L} \sum_{t=1}^{L} x_i(t)$$

Then, we formulate the constrained least squares (CLS) problem $$\text{minimize} \quad \mathcal{J}_{CLS}(h_i) = h_i^T R h_i - 2 h_i^T p_i + \frac{1}{L} \sum_{t=1}^{L} w_t x_i^2(t)$$

such that $h_i^T s_x = s_{d,i}$.

This is in the form of a quadratic linear programming problem with equality constraints. The explicit solution for $h_i$ is the linear combination of two vectors $h_{LS,i}$ and $h_{C,i}$ as $$h_i = h_{LS,i} + \lambda_i h_{C,i},$$

where $h_{LS,i}$ may be determined as discussed above, $$h_{C,i} = R^{-1} s_{x,i}$$

$$\lambda_i = \frac{s_{d,i} - h_{LS,i}^T s_x}{h_{C,i}^T s_x}.$$

It is straightforward to show that $h_i^T s_x = s_{d,i}$. This constrained least squares (CLS) solution works best if the constraint is highly accurate; that is, the sample means are very close to the true means.

In examples, it is understood that the system 10, devices and modules discussed herein may include or be part of a computer system that may be included and/or operated within which a set of instructions, for causing the system, devices and modules to perform any one or more of the methodologies discussed herein, may be executed. In specific examples, the system 10 and its components may be connected (e.g., networked) to other machines in a local area network (LAN), an intranet, an extranet, or the Internet. The system 10 may operate in the capacity of a server or a client machine in a client-server network environment, or as a peer machine in a peer-to-peer (or distributed) network environment. It is understood that the system may be or include a personal computer (PC), a tablet PC, a set-top box (S T B), a personal digital assistant (PDA), a cellular telephone, a web appliance, a server, a network router, switch or bridge, or any machine capable of executing the computer application or another other set of instructions (sequential or otherwise) that specify actions to be taken by that system. Further, the term "system" shall also be taken to include any collection of machines that individually or jointly execute a set (or multiple sets) of instructions to perform any one or more of the methodologies discussed herein.

The exemplary system and components thereof may include a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and steps discussed herein.

The system 10 may further include a network interface device (e.g., GUI), a video display unit (e.g., a liquid crystal display (LCD) or a cathode ray tube (CRT)), an alphanumeric input device (e.g., keyboard, keypad), a cursor control device (e.g., mouse. touchpad), and a signal generation device (e.g., a speaker).

Data storage device may include a machine-readable storage medium (or more specifically a computer-readable storage medium) having one or more sets of instructions (e.g., reference generation module) embodying any one or more of the methodologies of functions described herein. The reference generation module may also reside, completely or at least partially, within main memory and/or within processing device during execution thereof by computer system; main memory and processing device also constituting machine-readable storage media. The reference generation module may further be transmitted or received over a network via network interface device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features of the system 10 described by example herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The instructions may include, for example, computer-executable instructions and data which cause a general purpose computer, special purpose computer, or special purpose processing device to perform a certain function or group of functions. Computer-executable instructions also include program modules that are executed by computers in stand-alone or network environments. Generally, program modules and devices discussed herein may include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The disclosure is related to a system or apparatus for performing the operations herein. The system may be specially constructed for the required purposes or it may comprise a general purpose computing device selectively activated or reconfigured by a computer program stored therein. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The ability to measure vehicle emissions in the real-world on a mass (grams) basis. EPA uses emissions on a mass per distance and mass per time basis for its regulations and modeling efforts to characterize emissions released into the environment from mobile sources. Previous RSD systems only measured emissions in concentrations and used concentration ratios (HC/CO2, NOx/CO2, etc) to try to characterize or reference the vehicle's emissions. This new methodology uses vortex entrainment of a moving vehicle to calculate emissions in grams per mile or grams per hour. This provides a better understanding and a greater characterization of total emissions being emitted into the environment throughout the day by vehicles. Further, this approach improves real-world emissions modeling both locally and nationally plus helps identify that fraction of the fleet that contributes the most emissions. Moreover, this approach allows for the expansion into the measurement of other gaseous and particulate matter emissions sources such as exhaust, tire, and brake particulate matter sources.

The ability to measure emissions in the real-world from on-highway vehicles to a lower detectable limit than existing RSD systems are able to measure. Presently, RSD system can only measure the highest emitting vehicles and cannot measure most of the fleet because the RSD systems detection limits are too high. Lower detection limits via this invention provide a more complete emissions profile to be captured from the on-highway fleet and therefore provide a greater characterization and understanding of total emissions being emitted into the environment throughout the day.

The ability to separate different sources of emissions on a moving vehicle in the real-world provides significant benefits. EPA and States have conducted numerous investigations and test programs over many years to find a way to be able to measure evaporative emissions from a vehicle. This methodology will be able to identify and separate those source emissions (exhaust and evaporative emissions) to create a more complete on-highway emission profile in a non-intrusive manner in the real-world. In addition, this approach provides an improved understanding through quantification of real-world evaporative emissions to help government and industry identify options or methods to reduce these emissions through either regulatory or repair efforts and improve vehicle design accordingly.

Improved field measurement techniques allow for testing of vehicles in the real-world and gather emission data in a non-intrusive manner that does not burden the public. This new approach enables expansion of RSD abilities to gather large amount of real-world emission and vehicle data needed to support both national and local areas environmental control measures and keep the environment safe. This new approach also improves our understanding of parameters that might contribute to how much and when evaporative emissions occur. EPA has a basic understanding but lacks a means to gather enough real-world data to understand either the manufacturing or environmental factors that contribute to evaporative emissions such as (vehicle age, vehicle maintenance, hot or cold climate issues, canister manufacturing problems, etc). This further enables improvements to the certification and in-use testing of vehicles conducted by OEMs and the EPA in the ability to find and identify exhaust and evaporative emissions. This new approach allows for the ability to measure and characterize emissions from other mobile sources that are not presently measured under real-world, in-use conditions such as locomotives, airplanes, marine vessels and other nonroad equipment.

The exemplary depicted sequence of executable method steps represents one example of a corresponding sequence of acts for implementing the functions described in the steps. The exemplary depicted steps may be executed in any reasonable order to carry into effect the objectives of the disclosed embodiments. No particular order to the disclosed steps of the method is necessarily implied by the depiction in the figures, and the accompanying description, except where any particular method step is reasonably considered to be a necessary precondition to execution of any other method step. Individual method steps may be carried out in sequence or in parallel in simultaneous or near simultaneous timing. Additionally, not all of the depicted and described method steps need to be included in any particular scheme according to disclosure.

Those skilled in the art will appreciate that other embodiments of the disclosed subject matter may be practiced with many types of embodiments where emission rates (g/mile) and/or release rates (g/hr) could be determined remotely as discussed herein. Some examples may include: a) Diesel exhaust gas and particulate material emissions from heavy-duty diesel trucks; b) Tire particulate emissions from cars and trucks; c) Brake pad particulate emissions from cars and trucks; d) Simultaneous remote quantification of the separate emission rates from brake pad, tire, and diesel exhaust particulate emissions, which have separate emissions release locations, from cars and trucks; e) Remote measurement of sulfur dioxide and particulate emission rates from ships in port; f) Remote measurement of gas and particulate material emission rates from stacks of ships on the high seas; g) Remote measurement of emission rates of stationary sources (e.g., power generating stations, refineries) in a wind field, from outside the property boundaries; and h) Emission rates of in-flight aircraft. It should be understood that these are non-limiting examples of the variations that may be undertaken according to the disclosed schemes. In other words, no particular limiting configuration is to be implied from the above description and the accompanying drawings.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A system for quantifying an object's mass emissions, comprising:
 a first sensor configured to measure a portion of a mass of an emitted emission material surrounding an object in motion relative to a surrounding medium;
 a second sensor configured to estimate a first relative velocity of the object in motion with respect to the first sensor;
 a third sensor configured to estimate a velocity of the surrounding medium;
 a vortex shape calculation device configured to estimate a second relative velocity of the object in motion with respect to the surrounding medium based on the first relative velocity and the estimated velocity of the surrounding medium; and
 an emission calculation device configured to determine the mass of the emitted emission materials surrounding the object per unit time or per unit distance travelled by the object based on the measured portion, the estimated first relative velocity and the estimated second relative velocity.

2. The system of claim 1, wherein the motion of the object relative to the surrounding medium produces a vortex that temporarily stores the portion of the mass of the emitted emission materials.

3. The system of claim 2, wherein the determined mass of one of the emitted emission materials per unit time is proportional to the first sensor measurement of the portion of the mass of the one emitted emission material in the vortex and inversely proportional to a vortex entrainment time.

4. The system of claim 3, wherein the object has a dimension, and the vortex entrainment time is a function of at least one of the second relative velocity of the object in motion with respect to the surrounding medium, an estimated source location on the object, and the dimension of the object.

5. The system of claim 3, wherein the determined mass of one of the emitted emission materials per unit distance is proportional to the determined mass of the one emitted emission material per unit time and inversely proportional to the first relative velocity of the object in motion.

6. The system of claim 1, wherein the determined mass of the emitted emission materials surrounding the object per unit time or per unit distance travelled by the object enables real world profiling or characterizations of the emitted emission materials.

7. A system for quantifying an object's mass emissions, comprising
a sensor that measures one of spatial distributions and temporal distributions of a mass of a plurality of emitted emission materials surrounding an object in motion relative to a surrounding medium; and
an emission calculation device configured to combine the measured distributions of the plurality of emitted emission materials from the sensor,
wherein portions of the masses of the emitted emission materials have different source locations on the object, the emission calculation device further configured to determine a collective mass of the portions of masses of the emitted emission materials having the different source locations.

8. The system of claim 7, wherein the emission calculation device is further configured to apply a blind source separation technique to combine the measurements of the plurality of emitted emission materials surrounding the object to produce separated patterns of the relative masses of the emitted emission materials.

9. The system of claim 8, wherein the blind source separation technique includes an independent component analysis technique applied to at least two of the measurements of the plurality of emitted emission materials surrounding the object to produce a pattern of the relative masses of the emitted emission materials as an output.

10. The system of claim 8, wherein the blind source separation technique is applied to at least two of the measurements of the plurality of emitted emission materials surrounding the object to produce at least two patterns of the relative masses of the emitted emission materials as outputs of the technique.

11. The system of claim 8, wherein the blind source separation technique specifies an association between the separated patterns of the relative masses of the emitted emission materials.

12. The system of claim 8, further comprising applying an estimation technique to combine the measurements of the one of the spatial distributions and the temporal distributions of the masses of the plurality of emitted emission materials surrounding the object with a plurality of separated patterns of the relative masses of the emitted emission materials to determine portions of the masses of the emitted emission materials having different source locations.

13. The system of claim 12, further comprising:
a second sensor configured to estimate a first relative velocity of the object in motion with respect to the first sensor;
a third sensor configured to estimate a velocity of the surrounding medium;
a vortex shape calculation device configured to estimate a second relative velocity of the object in motion with respect to the surrounding medium based on the first relative velocity and the estimated velocity of the surrounding medium; and
the emission calculation device further configured to determine the mass of the emitted emission materials surrounding the object per unit time or per unit distance travelled by the object based on the measured mass, the first relative velocity and the estimated second relative velocity.

14. The system of claim 13, wherein the motion of the object relative to the surrounding medium produces a vortex that temporarily stores a portion of the mass of the emitted emission materials.

15. The system of claim 14, wherein the determined mass of one of the emitted emission materials per unit time is proportional to the first sensor measurement of a portion of the measured mass of the one emitted emission material in the vortex and inversely proportional to a vortex entrainment time.

16. The system of claim 15, wherein the object has a dimension, and the vortex entrainment time is a function of at least one of the second relative velocity of the object in motion with respect to the surrounding medium, an estimated source location on the object, and the dimension of the object.

17. The system of claim 15, wherein the determined mass of one of the emitted emission materials per unit distance is proportional to the determined mass of the one emitted emission material per unit time and inversely proportional to the first relative velocity of the object in motion.

18. The system of claim 7, wherein the determined collective mass of the portions of masses of the emitted emission materials having the different source locations enables real world profiling or characterizations of the emitted emission materials.

19. A method for quantifying an object's mass emissions, comprising:
measuring a portion of a mass of an emitted emission material surrounding an object in motion relative to a surrounding medium via a first sensor;
estimating a first relative velocity of the object in motion with respect to the first sensor via a second sensor;
a third sensor configured to estimating a velocity of the surrounding medium via a third sensor;
estimating a second relative velocity of the object in motion with respect to the surrounding medium based on the first relative velocity and the estimated velocity of the surrounding medium via a vortex shape calculation device; and
determining the mass of the emitted emission materials surrounding the object per unit time or per unit distance travelled by the object via an emission calculation device based on the measured portion, the estimated first relative velocity and the estimated second relative velocity.

20. The method of claim 19, further comprising:
measuring one of spatial distributions and temporal distributions of the mass of a plurality of the emitted emission materials surrounding the object in motion relative to the surrounding medium via the first sensor;
aggregating the measured distributions of each of the emitted emission materials via an emission calculation device, wherein portions of the masses of the emitted emission materials have different source locations on the object; and determining a collective mass of the portions of masses of the emitted emission materials having the different source locations via the emission calculation device.

\* \* \* \* \*